(12) United States Patent
Homma

(10) Patent No.: US 11,263,777 B2
(45) Date of Patent: Mar. 1, 2022

(54) INFORMATION PROCESSING APPARATUS AND INFORMATION PROCESSING METHOD

(71) Applicant: SONY CORPORATION, Tokyo (JP)

(72) Inventor: Shunichi Homma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/485,932

(22) PCT Filed: Feb. 21, 2018

(86) PCT No.: PCT/JP2018/006254
§ 371 (c)(1),
(2) Date: Aug. 14, 2019

(87) PCT Pub. No.: WO2018/207426
PCT Pub. Date: Nov. 15, 2018

(65) Prior Publication Data
US 2020/0126254 A1 Apr. 23, 2020

(30) Foreign Application Priority Data
May 9, 2017 (JP) .............................. JP2017-092793

(51) Int. Cl.
*G06T 7/73* (2017.01)
*G06K 9/46* (2006.01)

(52) U.S. Cl.
CPC .............. *G06T 7/74* (2017.01); *G06K 9/4604* (2013.01); *G06T 2207/20081* (2013.01)

(58) Field of Classification Search
CPC ...... A61B 8/5246; G06K 9/4609; G06K 9/46; G06K 9/4604; G06T 7/74;
(Continued)

(56) References Cited

U.S. PATENT DOCUMENTS 6,064,749 A * 5/2000 Hirota ..................... G06F 3/011
345/7
2005/0190972 A1* 9/2005 Thomas ................. G06K 9/209
382/218
(Continued)

FOREIGN PATENT DOCUMENTS

| EP | 1901029 A2 | 3/2008 |
| JP | 2008-070267 A | 3/2008 |
| JP | 2012-022411 A | 2/2012 |

OTHER PUBLICATIONS

International Search Report and Written Opinion of PCT Application No. PCT/JP2016/003877, dated May 15, 2018, 07 pages of ISRWO.

*Primary Examiner* — Nancy Bitar
(74) *Attorney, Agent, or Firm* — Chip Law Group

(57) ABSTRACT

Provided is an information processing apparatus including an estimating unit that estimates at least one of a location or an attitude of a predetermined chassis in real space on the basis of a first image captured by a first image capturing unit among a plurality of image capturing units held in the chassis. The information processing apparatus further includes a verifying unit that verifies a likelihood of the estimation result on the basis of a second image captured by a second image capturing unit having an optical axis different from an optical axis of the first image capturing unit among the plurality of image capturing units.

15 Claims, 19 Drawing Sheets

(58) Field of Classification Search
CPC . G06T 2207/20081; G06T 2207/20084; G06T 2207/30244; G06T 7/70; G06T 7/73
See application file for complete search history.

(56) References Cited

U.S. PATENT DOCUMENTS

| | | | |
|---|---|---|---|
| 2007/0167154 A1* | 7/2007 | Ohtomo | G01S 5/16 455/414.2 |
| 2008/0069405 A1* | 3/2008 | Endo | G06T 7/73 382/106 |
| 2012/0008830 A1* | 1/2012 | Yoshii | G06T 7/74 382/103 |
| 2014/0140609 A1* | 5/2014 | Krishnaswamy | G06T 7/70 382/159 |
| 2014/0270357 A1* | 9/2014 | Hampiholi | G06T 7/73 382/103 |

\* cited by examiner

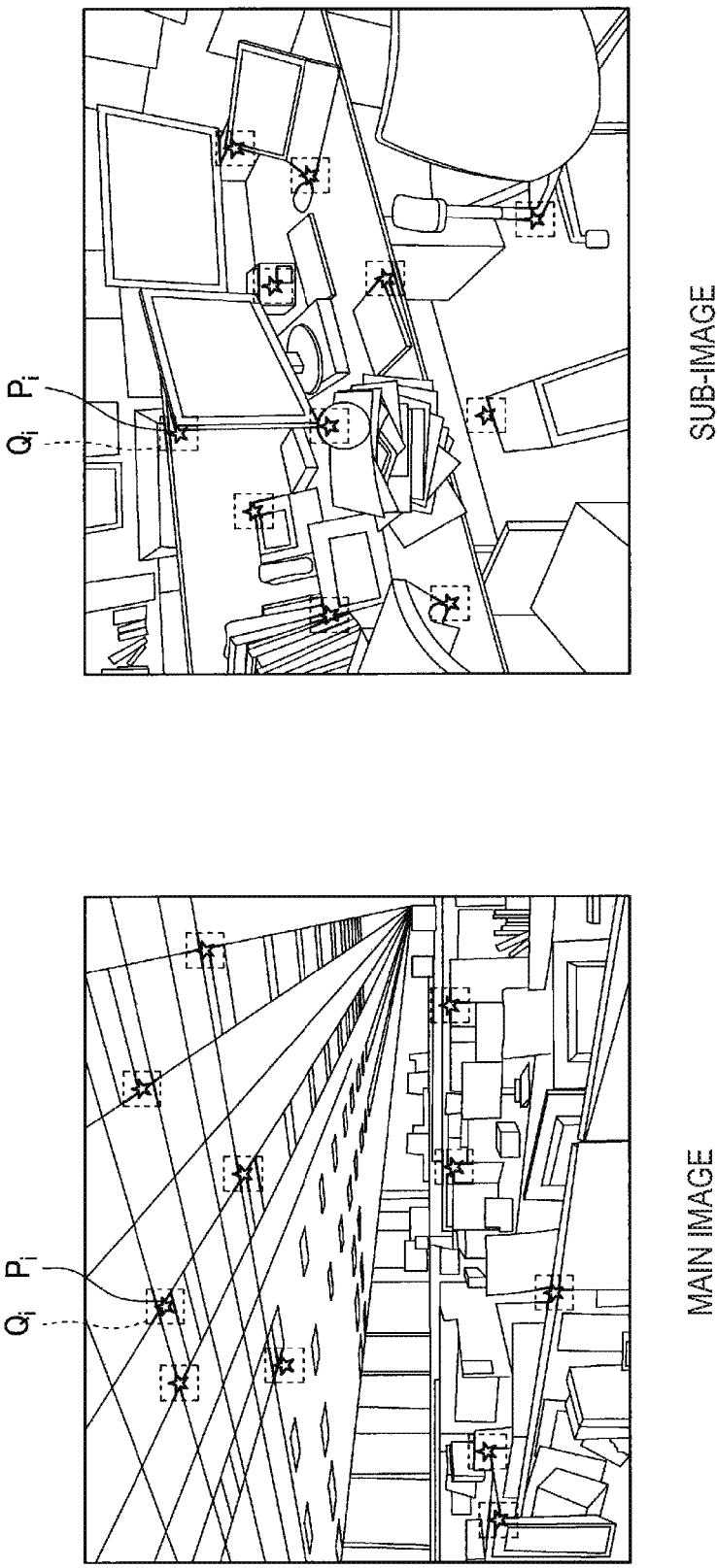

FIG. 7

| KEYFRAME INDEX | MAIN IMAGE CAPTURING UNIT ||| SUB IMAGE CAPTURING UNIT ||
|---|---|---|---|---|---|
| | LOCATION AND ATTITUDE | THREE-DIMENSIONAL COORDINATE OF LANDMARK | LOCAL FEATURE AMOUNTS | THREE-DIMENSIONAL COORDINATE OF LANDMARK | LOCAL FEATURE AMOUNTS |
| 1 | pose_m1 | lmkPos_m11 | feature_m11 | lmkPos_s11 | feature_s11 |
| | | lmkPos_m12 | feature_m12 | lmkPos_s12 | feature_s12 |
| | | ... | ... | ... | ... |
| 2 | pose_m2 | lmkPos_m21 | feature_m21 | lmkPos_s21 | feature_s21 |
| | | lmkPos_m22 | feature_m22 | lmkPos_s22 | feature_s22 |
| | | ... | ... | ... | ... |
| ... | | | | | |

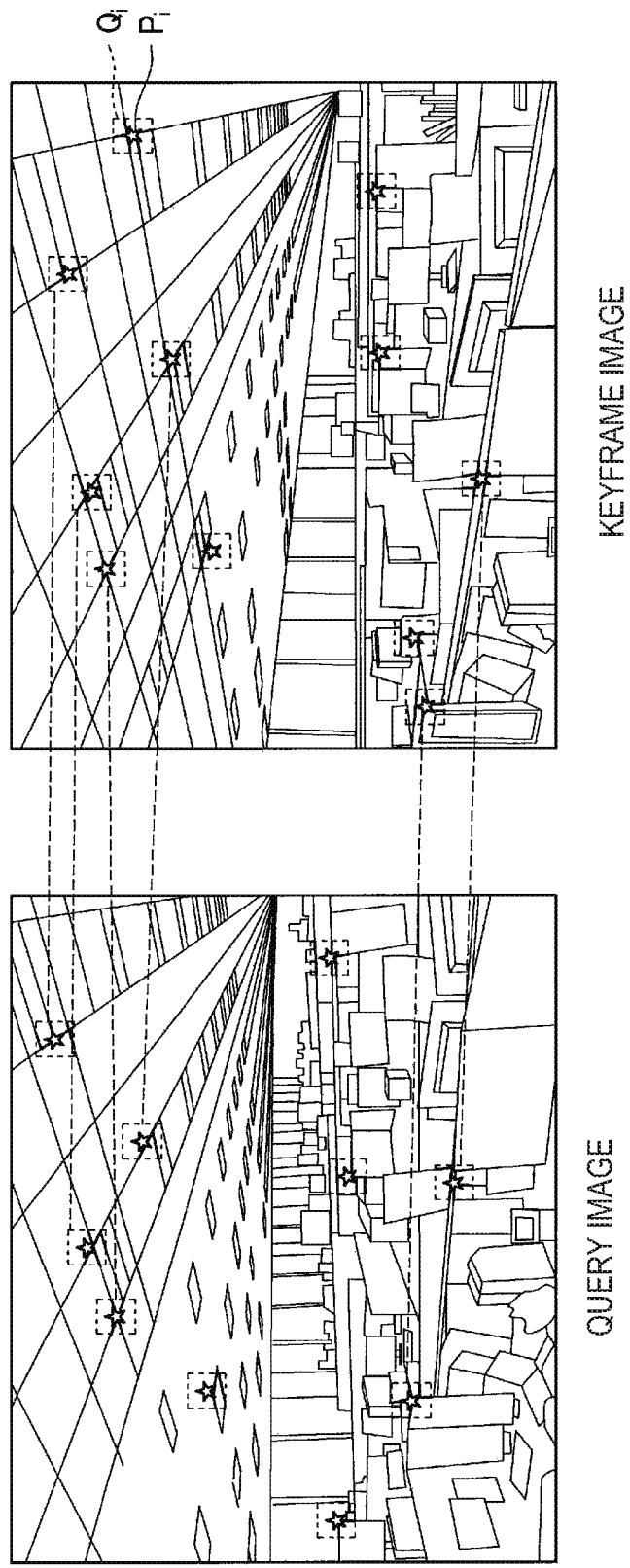

INFORMATION PROCESSING APPARATUS AND INFORMATION PROCESSING METHOD

CROSS REFERENCE TO RELATED APPLICATIONS

This application is a U.S. National Phase of International Patent Application No PCT/JP2018/006254 filed on Feb. 21, 2018, which claims priority benefit of Japanese Patent Application No. JP 2017-092793 filed in the Japan Patent Office on May 9, 2017. Each of the above-referenced applications is hereby incorporated herein by reference in its entirety.

TECHNICAL FIELD

The present disclosure relates to an information processing apparatus, an information processing method, and a program.

BACKGROUND ART

In recent years, in accordance with advancement of an image recognition technology, it becomes possible to recognize a location and an attitude (orientation) of an object in real space which is located in real space (hereinafter, also referred to as a "real object") and which is captured as a subject by an image capturing unit such as a digital camera. Further, it becomes also possible to estimate (recognize) a location and an attitude in real space (that is, a self-location) of an image capturing unit, or the like, which captures an image of a real object by application of an object recognition technology. Still further, by utilizing such a technology of self-location estimation, it becomes also possible to estimate a self-location of a mobile object which moves in real space. For example, Patent Document 1 discloses an example of a technology for realizing a technology of self-location estimation.

CITATION LIST

Patent Document

Patent Document 1: Japanese Patent Application Laid-Open No. 2004-005593

SUMMARY OF THE INVENTION

Problems to be Solved by the Invention

By the way, self-location estimation is performed by, for example, comparing feature amounts extracted from an image captured by an image capturing unit with feature amounts acquired in the past in accordance with a location and an attitude of the image capturing unit in real space. Meanwhile, there is a case where images of scenes which are visually similar may be captured by the image capturing unit even in a case where locations and attitudes in real space are different from each other. In such a case, accuracy of self-location estimation may degrade, which may ultimately cause a situation where a location and an attitude in real space of a target object (for example, the image capturing unit itself, a mobile object in which the image capturing unit is held) are erroneously estimated.

Therefore, the present disclosure proposes an information processing apparatus, an information processing method, and a program which enable estimation of a location and an attitude of a target object in real space in a more preferred aspect.

Solutions to Problems

According to the present disclosure, there is provided an information processing apparatus including: an estimating unit configured to estimate at least one of a location or an attitude of a predetermined chassis in real space on the basis of a first image captured by a first image capturing unit among a plurality of image capturing units held in the chassis; and a verifying unit configured to verify a likelihood of the estimation result on the basis of a second image captured by a second image capturing unit having an optical axis different from an optical axis of the first image capturing unit among the plurality of image capturing units.

Further, according to the present disclosure, there is provided an information processing method including: by a computer, estimating at least one of a location or an attitude of a predetermined chassis in real space on the basis of a first image captured by a first image capturing unit among a plurality of image capturing units held in the chassis; and verifying a likelihood of the estimation result on the basis of a second image captured by a second image capturing unit having an optical axis different from an optical axis of the first image capturing unit among the plurality of image capturing units.

Further, according to the present disclosure, there is provided a program causing a computer to execute: estimating at least one of a location or an attitude of a predetermined chassis in real space on the basis of a first image captured by a first image capturing unit among a plurality of image capturing units held in the chassis; and verifying a likelihood of the estimation result on the basis of a second image captured by a second image capturing unit having an optical axis different from an optical axis of the first image capturing unit among the plurality of image capturing units.

Effects of the Invention

As described above, according to the present disclosure, an information processing apparatus, an information processing method, and a program which enable estimation of a location and an attitude of a target object in real space in a more preferred aspect.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram for explaining an example of information acquired from images respectively captured by a main image capturing unit and a sub-image capturing unit.

FIG. 7 is a diagram illustrating an example of information registered as keyframes.

FIG. 8 is an explanatory diagram for explaining an overview of processes relating to estimation of attitude parameters.

MODE FOR CARRYING OUT THE INVENTION

Figure 1:
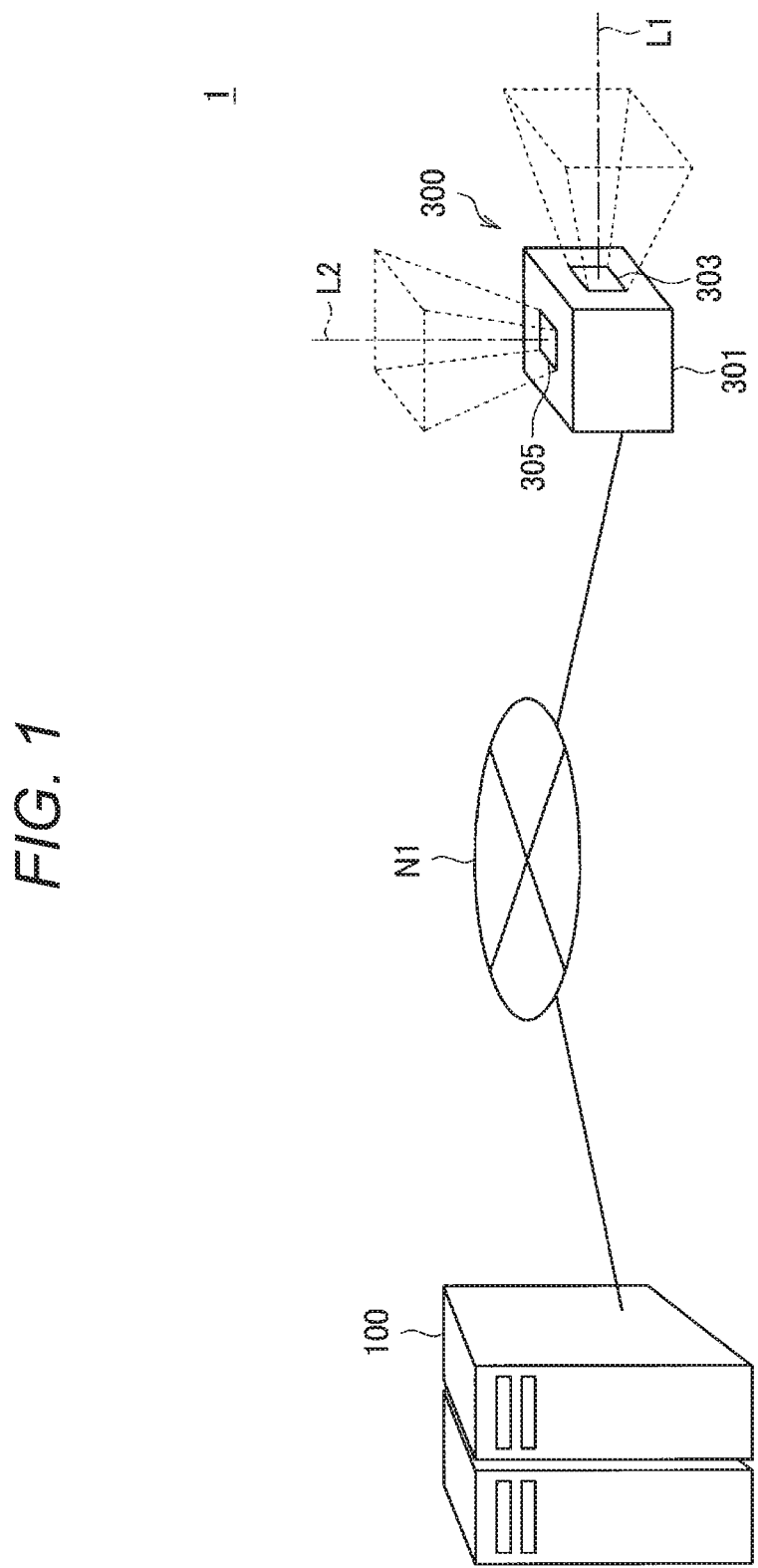
FIG. 1 is a diagram illustrating an example of a schematic system configuration of an information processing system according to an embodiment of the present disclosure.

Hereinafter, a preferred embodiment of the present disclosure will be described in detail with reference to the appended drawings. Note that, in this specification and the appended drawings, structural elements that have substantially the same function and configuration are denoted with the same reference numerals, and repeated explanation of these structural elements is omitted.

Note that description will be provided in the following order.

1. Schematic configuration
2. Study regarding self-location estimation
3. Technical features
3.1. Basic principle
3.2. Functional configuration
3.3. Processes
3.4. Modified examples
4. Hardware configuration
5. Conclusion

1. SCHEMATIC CONFIGURATION

First, an example of a schematic system configuration of an information processing system according to an embodiment of the present disclosure will be described with reference to FIG. 1. FIG. 1 is a diagram illustrating an example of the schematic system configuration of the information processing system according to the present embodiment.

As illustrated in FIG. 1, the information processing system 1 according to the present embodiment includes a mobile object 300 which becomes a target for estimation of a location and an attitude in real space, and an information processing apparatus 100. The information processing apparatus 100 and the mobile object 300 are configured to, for example, transmit and receive information to and from each other via a predetermined network N1. Note that a type of the network N1 that connects the information processing apparatus 100 and the mobile object 300 is not particularly limited. As a specific example, the network N1 may be configured as a so-called wireless network such as a network standard based on the LTE, the Wi-Fi (registered trademark), or the like. In addition, the network N1 may be configured as the Internet, a dedicated line, a local area network (LAN), a wide area network (WAN), or the like. In addition, the network N1 may include a plurality of networks and at least a part thereof may be configured as a wired network.

As described above, the mobile object 300 corresponds to an object which becomes a target for estimation of a location and an attitude in real space. Specific examples of the mobile object 300 can include an apparatus which is used by being worn on a user, such as a glasses-type wearable device, a mobile object such as a vehicle and a drone, or the like.

The mobile object 300 includes various kinds of devices for acquiring information to be utilized for estimation of a location and an attitude of the mobile object 300 in real space on the basis of a so-called self-location estimation technology. For example, as illustrated in FIG. 1, the mobile object 300 according to the present embodiment includes a main image capturing unit 303 and a sub-image capturing unit 305. In FIG. 1, a reference numeral L1 schematically indicates an optical axis of the main image capturing unit 303. Further, a reference numeral L2 schematically indicates an optical axis of the sub-image capturing unit 305. Further, a reference numeral 301 schematically indicates a chassis of the mobile object 300. That is, in the information processing system 1 according to the present embodiment, the main image capturing unit 303 and the sub-image capturing unit 305 are held in the chassis 301 so as to have optical axes different from each other. Note that the main image capturing unit 303 and the sub-image capturing unit 305 are more preferably held in the chassis 301 so as to be able to capture images in directions different from each other with respect to the chassis 301. In other words, the main image capturing unit 303 and the sub-image capturing unit 305 are more preferably held in the chassis 301 so as to be able to capture images of areas different from each other in real space.

The mobile object 300 transmits images respectively captured by the main image capturing unit 303 and the sub-image capturing unit 305 (that is, captured images of scenes in real space) to the information processing apparatus 100 via the network N1.

The information processing apparatus 100 can be configured as, for example, a server, or the like. The information processing apparatus 100 acquires the images respectively captured by the main image capturing unit 303 and the sub-image capturing unit 305 from the mobile object 300 via the network N1 and estimates a location and an attitude of the mobile object 300 in real space on the basis of the acquired images. As a specific example, the information processing apparatus 100 estimates the location and the attitude of the mobile object 300 in real space on the basis of a so-called self-location estimation technology. More specifically, the information processing apparatus 100 extracts feature points and feature amounts from the images by performing image analysis on the acquired images. Then, the information processing apparatus 100 estimates the location and the attitude of the mobile object 300 in real space by comparing extraction results of the feature points and the feature amounts with feature points and feature amounts acquired in the past in accordance with the location and the attitude in real space. Note that operation of the information processing apparatus 100 will be separately described in detail later.

An example of the schematic system configuration of the information processing system according to an embodiment of the present disclosure has been described above with reference to FIG. 1. Note that the above-described configuration is merely an example, and the system configuration of the information processing system 1 according to the present embodiment is not necessarily limited to the example illustrated in FIG. 1. As a specific example, the mobile object 300 and the information processing apparatus 100 may be integrally configured.

2. STUDY REGARDING SELF-LOCATION ESTIMATION

Subsequently, to make it easier to understand features of the information processing system according to the present embodiment, problems to be solved by the information processing system according to the present embodiment will be summarized after an overview of an example of the method of self-location estimation and localization of the estimation result is described.

First, an overview of self-location estimation which uses an image captured by an image capturing unit as input will be described. In the self-location estimation which uses an image as input, for example, feature points are extracted from an image captured by an image capturing unit, and feature amounts at the feature points are extracted. Then, by extraction results of the feature points and the feature amounts being compared with information (for example, information accumulated in a database) regarding feature points and feature amounts acquired in the past in accordance with a location and an attitude in real space in a two-dimensional or three-dimensional manner, a location and an attitude of the image capturing unit in real space are estimated. Further, in the estimation, for example, PNP algorithm which uses a random sample consensus (RANSAC) framework, or the like, may be utilized.

Note that, in the following description, information indicating a location and an attitude of an object which becomes a target, such as an image capturing unit, in real space will be also referred to as "attitude parameters". Specifically, the attitude parameters can be expressed with information indicating a total of six degrees of freedom including information indicating three degrees of freedom of a location, and information indicating three degrees of freedom of rotation.

Note that examples of the information indicating three degrees of freedom of the location can include, for example, information which expresses length, width and height with an x-y-z coordinate system. Further, examples of the information indicating three degrees of freedom of rotation can include information which expresses rotation angles such as a roll angle, a pitch angle, and a yaw angle with a rotating coordinate system of $\varphi$, $\theta$, $\psi$, or the like, information (parameters) indicating rotation and an attitude of an object such as a rotation matrix, or the like.

The self-location estimation technology as described above is expected to be applied in various fields such as, for example, autonomous traveling of a mobile object such as a vehicle, autonomous flight of a so-called drone such as an unmanned aerial vehicle (UAV) and a micro aerial vehicle (MAV), autonomous behavior of a robot, and presentation of virtual information in augmented reality (AR) or virtual reality (VR).

A technology called simultaneous localization and mapping (SLAM) will be described next with reference to FIG. 2 as an example of a technology which utilizes self-location estimation.

SLAM is a technology in which self-location estimation and creation of an environmental map are performed in parallel by utilizing an image capturing unit such as a camera, various kinds of sensors, an encoder, or the like. As a more specific example, in SLAM (particularly, in Visual SLAM), a three-dimensional shape of a captured scene (or a subject) is sequentially restored on the basis of a moving image captured by an image capturing unit. Then, by a restoration result of the captured scene being associated with detection results of a location and an attitude of the image capturing unit, a map of a surrounding environment is created, and the location and the attitude of the image capturing unit (eventually, the mobile object 300) in the environment are estimated. Note that, for example, by providing various kinds of sensors such as an acceleration sensor and an angular velocity sensor at a chassis (for example, a chassis of the mobile object 300) in which the image capturing unit is held, it is possible to estimate the location and the attitude of the image capturing unit as information indicating relative change on the basis of detection results of the sensors. Of course, the method is not necessarily limited only to the method based on detection results of various kinds of sensors such as an acceleration sensor and an angular velocity sensor if it is possible to estimate the location and the attitude of the image capturing unit.

Figure 2:
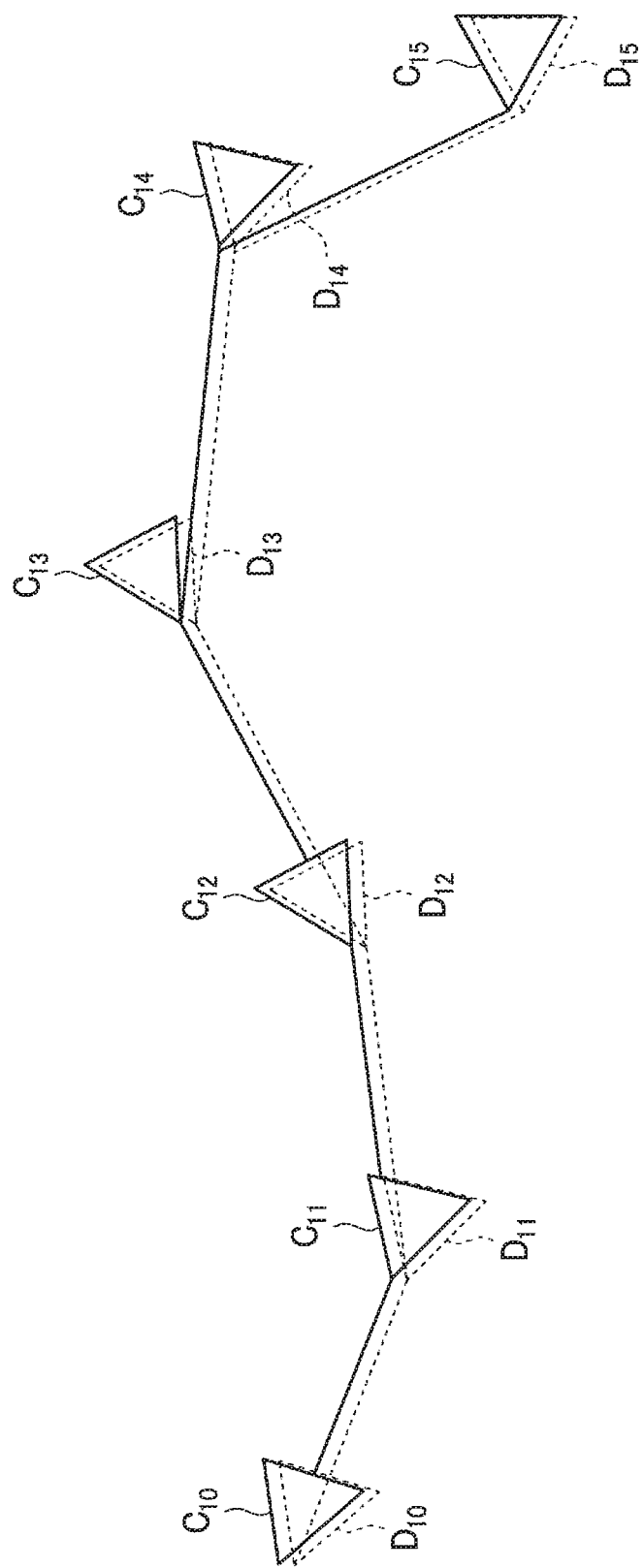
FIG. 2 is an explanatory diagram for explaining an example of a method of self-location estimation.

For example, FIG. 2 is an explanatory diagram for explaining an example of the method of self-location estimation, and illustrates an example of estimation results of the location and the attitude of the image capturing unit in real space using SLAM. In FIG. 2, markers indicated with reference numerals $C_{10}$ to $C_{15}$ schematically indicate time-series change of the location and the attitude of the image capturing unit (eventually, the mobile object 300) in real space. That is, FIG. 2 illustrates an example in a case where the location and the attitude of the image capturing unit sequentially transition over time in order of the markers $C_{10}$ to $C_{15}$. Further, markers indicated with reference numerals $D_{10}$ to $D_{15}$ schematically indicate estimation results of the location and the attitude of the image capturing unit in real space based on SLAM, and respectively correspond to the markers $C_{10}$ to $C_{15}$. As a specific example, the marker $D_{11}$ indicates estimation results of the location and the attitude of the image capturing unit in a state where the location and the attitude of the image capturing unit are as indicated with the marker $C_{11}$.

In SLAM, if the location and the attitude of the image capturing unit are estimated as an absolute location in real space at a desired timing, it is possible to estimate the location and the attitude of the image capturing unit thereafter, for example, by sequentially acquiring information indicating relative change on the basis of detection results of various kinds of sensors. As a specific example, in a case of an example illustrated in FIG. 2, if the estimation result $D_{10}$ of the location and the attitude of the image capturing unit is estimated as the absolute location in real space, it is possible to estimate the estimation results $D_{11}$ to $D_{15}$ by utilizing information indicating relative change of the location and the attitude of the image capturing unit in real space based on the detection results of various kinds of sensors on the basis of the estimation result $D_{10}$.

Meanwhile, in a method such as SLAM in which the location and the attitude of the image capturing unit in real space (that is, the absolute location) are indirectly estimated by sequentially acquiring relative change of the location and the attitude of the image capturing unit, a process which is so-called localization is important. Note that, in the present disclosure, localization indicates, for example, a process of estimating (or re-estimating) the location and the attitude of the image capturing unit in real space as the absolute location through self-location estimation based on the image captured by the image capturing unit.

Figure 3:
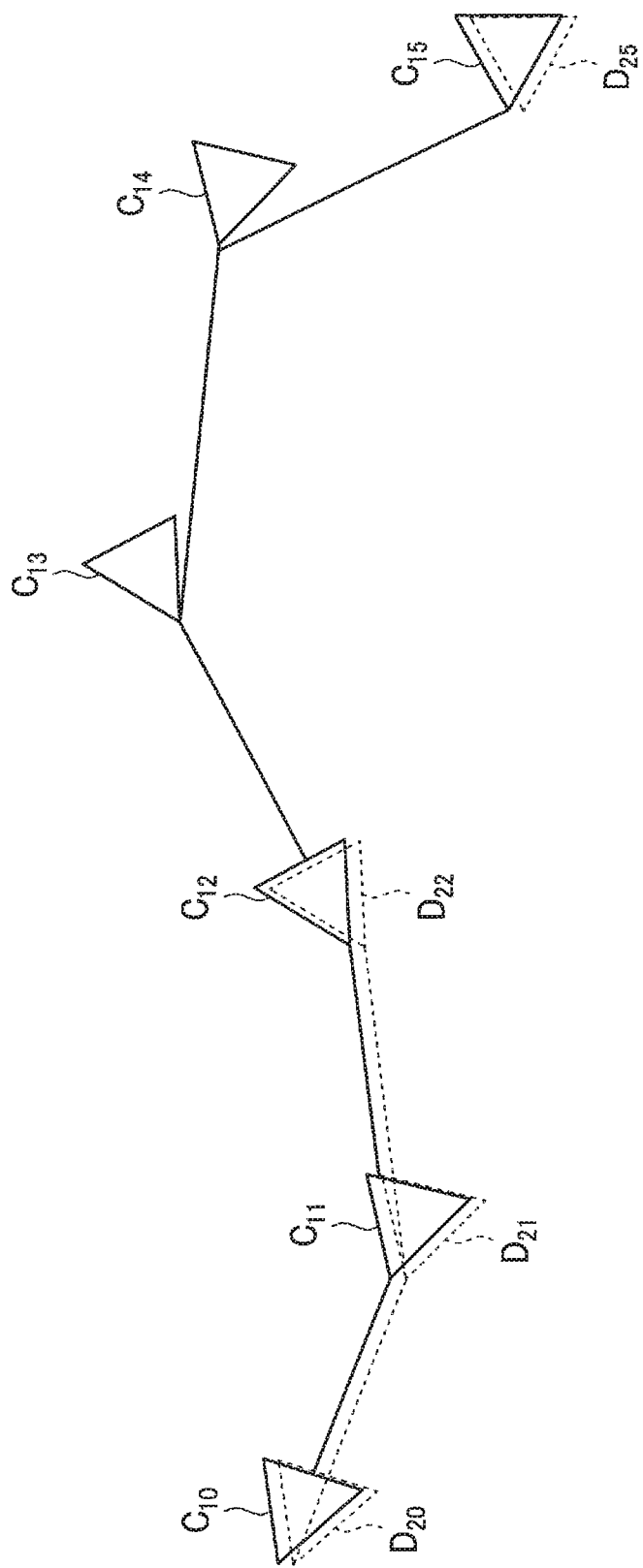
FIG. 3 is an explanatory diagram for explaining an overview of localization.
Figure 4:
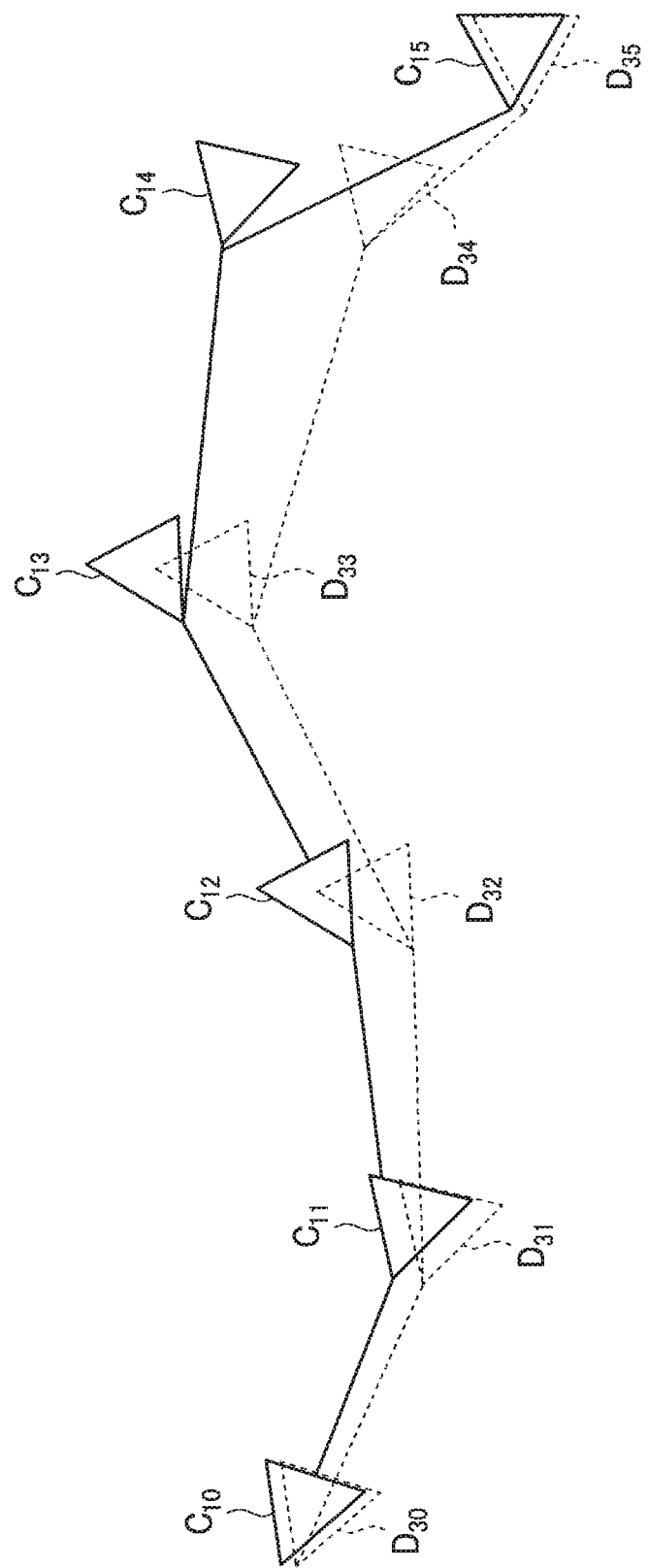
FIG. 4 is an explanatory diagram for explaining an overview of localization.

An overview of localization will be described below with reference to FIG. 3 and FIG. 4. FIG. 3 and FIG. 4 are explanatory diagrams for explaining an overview of the localization.

For example, FIG. 3 illustrates an example in a case where tracking of relative change of the location and the attitude of the image capturing unit fails. Specifically, FIG. 3 illustrates an example in a state where detection of relative change of the location and the attitude of the image capturing unit fails at a timing between the marker $C_{12}$ and the marker $C_{13}$, and it becomes difficult to track the location and the attitude of the image capturing unit after the marker $C_{13}$. For example, the markers indicated with the reference numerals $D_{20}$ to $D_{22}$ schematically indicate estimation results of the location and the attitude of the image capturing unit in real space based on SLAM, and respectively correspond to the markers $C_{10}$ to $C_{12}$. That is, in the example illustrated in FIG. 3, relative change of the location and the attitude of the image capturing unit becomes unclear between the marker $C_{12}$ and the marker $C_{13}$, and it becomes practically difficult to estimate the location and the attitude of the image capturing unit in real space after the marker $C_{13}$.

In such a case, for example, it become possible to restart tracking of the location and the attitude of the image capturing unit by performing estimation of the location and the attitude (that is, attitude parameters) of the image capturing unit in real space again through localization. For example, in the example illustrated in FIG. 3, a localization process is performed at a timing corresponding to the marker $C_{15}$, and the location and the attitude of the image capturing unit in real space are estimated again as the absolute location. A marker indicated with a reference numeral $D_{25}$ schematically indicates a result of re-estimation of the location and the attitude of the image capturing unit in real space based on the localization process. That is, in the example illustrated in FIG. 3, it becomes possible to restart tracking of the location and the attitude of the image capturing unit after the marker $C_{15}$ by utilizing the estimation result $D_{25}$ at a timing corresponding to the marker $C_{15}$.

Further, FIG. 4 illustrates an example in a case where errors occur between the estimation result of relative change of the location and the attitude of the image capturing unit and relative change of the actual location and the actual attitude of the image capturing unit. Specifically, in the example illustrated in FIG. 4, errors occur between the estimation result of relative change of the location and the attitude of the image capturing unit and relative change of the actual location and the actual attitude of the image capturing unit at timings respectively corresponding to the markers $C_{11}$ to $C_{14}$. The errors occurring at the respective timings in this manner are sequentially accumulated as an accumulated error. From such characteristics, as long as tracking of the relative change of the location and the attitude of the image capturing unit continues, the accumulated error tends to increase in proportion. For example, markers indicated with reference numerals $D_{30}$ to $D_{34}$ schematically indicate estimation results of the location and the attitude of the image capturing unit in real space based on SLAM, and respectively correspond to the markers $C_{10}$ to $C_{14}$. That is, in the example illustrated in FIG. 4, in accordance with increase in the accumulated error, an error between the estimation result $D_{34}$ of the location and the attitude of the image capturing unit in real space and the actual location and the actual attitude of the image capturing unit in real space (that is, the location and the attitude indicated with the marker $C_{14}$) becomes greater at a timing corresponding to the marker $C_{14}$.

Also in such a case, for example, it becomes possible to solve the accumulated error by estimating the location and the attitude (that is, attitude parameters) of the image capturing unit in real space again through localization. For example, in the example illustrated in FIG. 4, a localization process is performed at a timing corresponding to the marker $C_{15}$, and the location and the attitude of the image capturing unit in real space are estimated again as the absolute location. A marker indicated with a reference numeral $D_{35}$ schematically indicates a result of re-estimation of the location and the attitude of the image capturing unit in real space based on the localization process. That is, in the example illustrated in FIG. 4, it becomes possible to solve the accumulated error accumulated between the markers $C_{11}$ to $C_{14}$ with the estimation result $D_{35}$ at a timing corresponding to the marker $C_{15}$.

Meanwhile, also in a case where the location and the attitude of the image capturing unit in real space are estimated (or re-estimated) as the absolute location through self-location estimation based on the image captured by the image capturing unit as in the localization process, there is a case where an error may occur in the estimation result.

For example, there is a case where images of scenes which are visually similar are captured as images by the image capturing unit although the locations and the attitudes in real space are different from each other. As a more specific example, there is a case where an image of a scene in which a predetermined pattern repeatedly appears may be captured as an image under the condition that an image of a portion corresponding to a floor, a paved road, a ceiling, a wall of a building, or the like, is captured as a subject. Under such a condition that an image of a scene in which a repetitive pattern appears is captured, there is a case where images of scenes which are visually similar are captured although the locations and the attitudes in real space are different from each other. Further, there is a case where images of scenes which are visually similar are captured as images under the condition that the locations and the attitudes in real space are different from each other as well as the scene in which a repetitive pattern appears. In such a case, accuracy of self-location estimation degrades, and, eventually, a situation is assumed where the location and the attitude of an object which becomes a target (for example, the image capturing unit or a mobile object in which the image capturing unit is held) in real space may be erroneously estimated.

Also under such a condition that images of scenes which are visually similar are captured, in a case where the locations and the attitudes in real space at which images of the respective scenes are captured are spatially largely distant from each other, for example, it is possible to prevent erroneous estimation of attitude parameters by utilizing other detection means such as an RF tag and a global positioning system (GPS). However, there is a case where repetition patterns are concentrated in relatively narrow space on a floor, a paved road, a ceiling, a wall of a building, or the like, in which case, it is difficult to detect erroneous estimation of attitude parameters (that is, prevent erroneous estimation of attitude parameters) even if an RF tag, a GPS, or the like, is utilized.

Further, as another method, there is a case where it is possible to prevent erroneous estimation of attitude parameters by determining appropriateness of estimation results of the attitude parameters through matching of a shape of the object which utilizes a depth sensor, or the like. However, the repetitive pattern is not limited to a two-dimensional pattern, or the like, and, for example, a pattern having a three-dimensional shape, or the like, can be assumed. Under the condition that a repetitive pattern having a three-dimensional shape appears in this manner, even if matching of a shape of an object is performed by utilizing a depth sensor, or the like, it is difficult to determine appropriateness of the attitude parameters (that is, prevent erroneous estimation of the attitude parameters).

In view of such circumstances, the present disclosure proposes an example of a technology which enables further improvement of accuracy relating to estimation of a location and an attitude (that is, attitude parameters) in real space of an object which becomes a target such as an image capturing unit and a mobile object in which the image capturing unit is held, and eventually, enables prevention of erroneous estimation of the location and the attitude.

3. TECHNICAL FEATURES

Technical features of the information processing system according to an embodiment of the present disclosure will be described below.

3.1. Basic Principle

First, basic principle of processes relating to estimation of attitude parameters (in other words, processes relating to self-location estimation) of an object which becomes a target (for example, a mobile object) in the information processing system according to the present embodiment will be described below.

As described with reference to FIG. 1, in the information processing system 1 according to the present embodiment, a plurality of image capturing units (that is, the main image capturing unit 303 and the sub-image capturing unit 305) is provided to have optical axes (that is, the optical axes L1 and L2) different from each other for an object (that is, the mobile object 300) which becomes a target for estimation of attitude parameters. At this time, relative positional relationship between the main image capturing unit 303 and the sub-image capturing unit 305 can be handled as known information, for example, by being calculated in advance as offset information.

Note that, a configuration each of the main image capturing unit 303 and the sub-image capturing unit 305 is not particularly limited if each of the main image capturing unit 303 and the sub-image capturing unit 305 can capture images in real space. As a specific example, each of the main image capturing unit 303 and the sub-image capturing unit 305 may be configured as a monocular camera or may be configured as a stereo camera. Further, the main image capturing unit 303 and the sub-image capturing unit 305 may have different configurations. Note that, in the following description, to make it easier to understand the technical features of the information processing system 1 according to the present embodiment, it is assumed that the main image capturing unit 303 and the sub-image capturing unit 305 have similar configurations.

(Registration Process)

Figure 5:
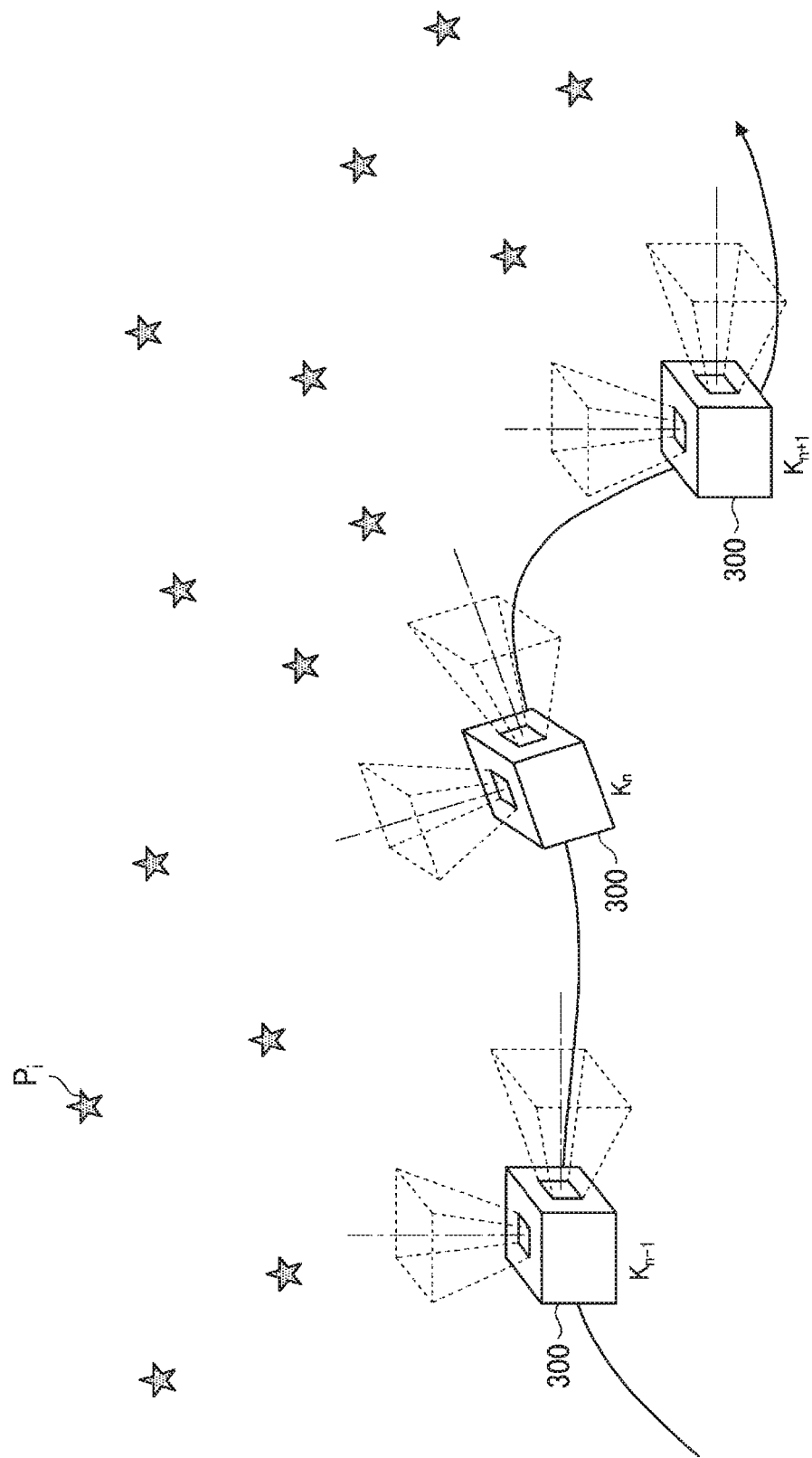
FIG. 5 is an explanatory diagram for explaining an example of processes of registering data to be utilized for estimation of attitude parameters in the information processing system according to the embodiment.

First, an example of a process of registering data which becomes a target for comparison with feature amounts extracted from an image captured by the image capturing unit upon estimation of attitude parameters in localization, or the like, will be described with reference to FIG. 5. FIG. 5 is an explanatory diagram for explaining an example of the process of registering data to be utilized for estimation of attitude parameters in the information processing system according to the present embodiment. Note that, in FIG. 5, a reference numeral $P_i$ corresponds to a portion indicating a feature which can be visually identified, such as a shape, color, tone, or the like, in real space, and will be hereinafter also referred to as a "landmark". That is, the landmark $P_i$ corresponds to a portion extracted as a feature point from the image captured by the image capturing unit.

As illustrated in FIG. 5, during the registration process, the self-location estimation of the mobile object 300 is performed through SLAM, or the like, while the mobile object 300 is caused to move in space (that is, real space) which is a registration target. For example, in FIG. 5, each of reference numerals $K_{n-1}$, $K_n$, and $K_{n+1}$ indicates time-series change of the location and the attitude of the mobile object 300 in real space. That is, in the example illustrated in FIG. 5, a case is illustrated where the location and the attitude of the mobile object 300 sequentially change over time in order of $K_{n-1}$, $K_n$, and $K_{n+1}$.

Further, an image of space (that is, real space) around the mobile object 300 is captured by the image capturing unit held in the mobile object 300 in accordance with each location and attitude along with the self-location estimation of the mobile object 300. Then, by an image analysis process being performed on the captured image, a location of the landmark $P_i$ captured in the image in real space is estimated (calculated). Note that, at this time, a result of depth sensing which utilizes a stereo camera, a distance sensor, or the like, may be utilized in estimation of the location of the landmark $P_i$ in real space.

Note that, as described above, in the information processing system 1 according to the present embodiment, the main image capturing unit 303 and the sub-image capturing unit 305 are held in the mobile object 300. Therefore, the locations of the respective landmarks $P_i$ captured in the images are estimated (calculated) on the basis of the images respectively captured by the main image capturing unit 303 and the sub-image capturing unit 305 along with self-location estimation of the mobile object 300.

Further, local feature amounts of partial areas (that is, areas near the landmarks $P_i$) in the images including the respective landmarks $P_i$ are extracted (calculated) for the respective landmarks $P_i$ captured in the images on the basis of the images respectively captured by the main image capturing unit 303 and the sub-image capturing unit 305.

Here, a process relating to extraction of local feature amounts of areas near the landmarks $P_i$ captured in the images on the basis of the images respectively captured by the main image capturing unit 303 and the sub-image capturing unit 305 will be described with reference to FIG. 6. FIG. 6 is an explanatory diagram for explaining an example of information acquired from the images respectively captured by the main image capturing unit 303 and the sub-image capturing unit 305. Note that, in the following description, the image captured by the main image capturing unit 303 will be also referred to as a "main image", and the image captured by the sub-image capturing unit 305 will be also referred to as a "sub-image".

In FIG. 6, the reference numeral $P_i$ indicates a landmark captured in the image. Further, a reference numeral $Q_i$ corresponds to a partial area near the landmark $P_i$ in the image. That is, the partial area $Q_i$ is set as a partial area including the landmark $P_i$ in the image for each landmark $P_i$.

Specifically, in the information processing system 1 according to the present embodiment, by image analysis processes being respectively performed on the captured main image and sub-image, the landmarks $P_i$ captured in the images are extracted from the respective images as the feature points. Then, partial areas $Q_i$ having a predetermined size are set for the respective feature points, and feature amounts (for example, features such as a shape, color, and tone) in the partial areas $Q_i$ are extracted as local feature amounts for the respective set partial areas $Q_i$. Note that, in a case where different local feature amounts are used by an estimating unit 101 and a verifying unit 103 of attitude parameters which will be described later, for example, a plurality of local feature amounts may be extracted for one feature point (that is, a landmark).

As described above, self-location estimation of the mobile object 300, estimation of locations of the landmarks $P_i$ captured in the respective main image and sub-image in real space, and extraction of local feature amounts corresponding to the respective landmarks $P_i$ are each sequentially performed while the mobile object 300 is caused to move. Then, the respective pieces of information estimated or calculated for each location and attitude of the mobile object 300 are associated as a series of data, and registered (recorded) in a predetermined storage area (such as, for example, a database) as keyframes.

For example, FIG. 7 is a diagram illustrating an example of information registered as keyframes. Specifically, in the example illustrated in FIG. 7, information corresponding to the main image capturing unit 303 and information corresponding to the sub-image capturing unit 305 are registered as keyframes.

The information corresponding to the main image capturing unit 303 includes, for example, estimation results of a location and an attitude (that is, attitude parameters) of the main image capturing unit 303, estimation results of locations of the landmarks $P_i$ captured in the main image in real space, and extraction results of the local feature amounts corresponding to the respective landmarks $P_i$. The attitude parameters of the main image capturing unit 303 are acquired, for example, as a result of self-location estimation of the mobile object 300. Further, there is a case where a plurality of landmarks $P_i$ is captured in the main image. Therefore, estimation results of locations of the landmarks $P_i$ in real space and extraction results of local feature amounts corresponding to the landmarks $P_i$ are registered for the respective landmarks $P_i$.

The information corresponding to the sub-image capturing unit 305 includes, for example, estimation results of locations of the landmarks $P_i$ captured in the sub-image in real space, and extraction results of local feature amounts corresponding to the respective landmarks $P_i$. Note that the location and the attitude of the sub-image capturing unit 305 in real space can be calculated on the basis of the estimation results of the location and the attitude of the main image capturing unit 303 and relative positional relationship between the main image capturing unit 303 and the sub-image capturing unit 305. Further, the relative positional relationship between the main image capturing unit 303 and the sub-image capturing unit 305 can be handled as known information by being calculated in advance as offset information as described above.

In this manner, the estimation results of the locations of the landmarks $P_i$ respectively captured in the main image and the sub-image in real space and extraction results of the local feature amounts corresponding to the respective landmarks $P_i$ are registered as keyframes for each location and attitude of the main image capturing unit 303 (eventually, the mobile object 300). The respective pieces of information registered as the keyframes as described above are utilized as data which becomes a target for comparison with the feature amounts extracted from the images captured by the image capturing unit upon estimation of the attitude parameters through localization, or the like.

(Localization Process)

Subsequently, a process relating to estimation of attitude parameters in localization, or the like, in the information processing system 1 according to the present embodiment will be described. Note that, in the following description, for convenience sake, the respective images (that is, the main image and the sub-image) captured by the main image capturing unit 303 and the sub-image capturing unit 305 at a moment of localization, or the like, will be also referred to as "query images", and the respective images which become acquisition sources of information registered in advance as the keyframes (in other words, information acquired in the past) will be also referred to as "keyframe images". Further, in the present description, it is assumed that the information processing apparatus 100 illustrated in FIG. 1 executes processes relating to estimation of attitude parameters in localization, or the like.

In the information processing system 1 according to the present embodiment, first, the information processing apparatus 100 estimates attitude parameters of the main image capturing unit 303 (eventually, the mobile object 300) by performing matching of local feature amounts extracted from the respective images between the query image and the keyframe image for the main image.

For example, FIG. 8 is an explanatory diagram for explaining an overview of the process relating to estimation of attitude parameters, and illustrates an example of extraction results of feature points respectively from the query image and the keyframe image, and setting results of partial areas $Q_i$ corresponding to the feature points.

Specifically, FIG. 8 illustrates an example in a case where locations and attitudes (that is, attitude parameters) of the main image capturing unit 303 (eventually, the mobile object 300) substantially match between the query image and the keyframe image. In such a case, at least a part of the query image, the landmark $P_i$ which is practically the same as the landmark $P_i$ captured at least a part of the keyframe image is captured. For example, in the example illustrated in FIG. 8, landmarks $P_i$ corresponding to the partial areas $Q_i$ associated between the query image and the keyframe image with dashed lines indicate the same locations in real space, and local feature amounts substantially match between the corresponding partial areas $Q_i$ at this time.

By utilizing such characteristics, the information processing apparatus 100 estimates attitude parameters of the main image capturing unit 303 (eventually, the mobile object 300) when the query image is captured. Specifically, the information processing apparatus 100 searches for a keyframe including information which substantially matches information regarding the feature amounts (that is, information regarding the landmark $P_i$ and information regarding the local feature amounts corresponding to the landmark $P_i$) extracted from the query image. Then, the information processing apparatus 100 estimates the attitude parameters of the main image capturing unit 303 when the query image is captured on the basis of the attitude parameters of the main image capturing unit 303 included in the found keyframe. Note that the process relating to estimation of attitude parameters in association with matching of the local feature amounts between the query image and the keyframe image will be separately described in more detail later.

Meanwhile, as described above, there is a case where images of scenes which are visually similar are captured as images also in a case where the locations and the attitudes in real space are different from each other. In such a case, accuracy relating to estimation of attitude parameters of the main image capturing unit 303 degrades, and eventually, there is also a case where the attitude parameters may be erroneously estimated. In view of such circumstances, in the information processing system 1 according to the present embodiment, by utilizing a sub-image captured by the sub-image capturing unit 305, accuracy relating to estimation of attitude parameters is improved, and erroneous estimation of the attitude parameters is prevented.

For example, FIG. 9 to FIG. 12 are explanatory diagrams for explaining basic principle of the process relating to estimation of attitude parameters in the information processing system 1 according to the present embodiment.

Figure 9:
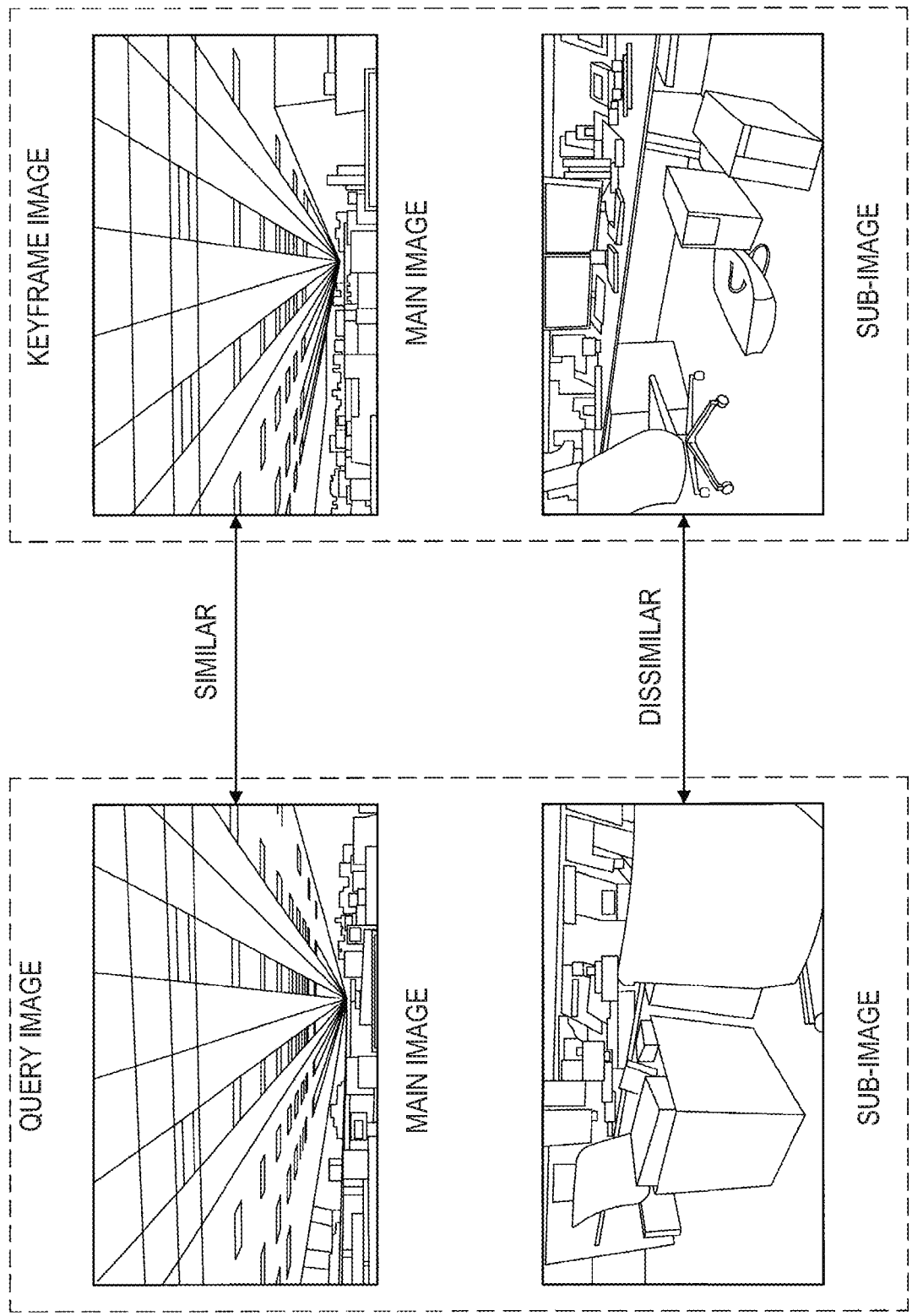
FIG. 9 is an explanatory diagram for explaining basic principle of the processes relating to estimation of attitude parameters in the information processing system according to the embodiment.

In the example illustrated in FIG. 9, an example is illustrated in a case where images of scenes which are similar to each other are captured as main images in a case where the query image and the keyframe image are captured at locations different from each other. Under such conditions, the feature amounts extracted from the respective main images substantially match, and there is also a case where attitude parameters of the main image capturing unit 303 may be erroneously estimated if the estimation is performed only using the main images.

Meanwhile, the sub-image capturing unit 305 is held so as to have an optical axis different from that of the main image capturing unit 303, and captures an image of a scene different from that captured by the main image capturing unit 303 (in other words, a different area in real space). Therefore, as illustrated in FIG. 9, also under the condition that the main images captured as the query image and the keyframe image are similar to each other, there is a case where the sub-images captured as the query image and the keyframe image are dissimilar.

Figure 10:
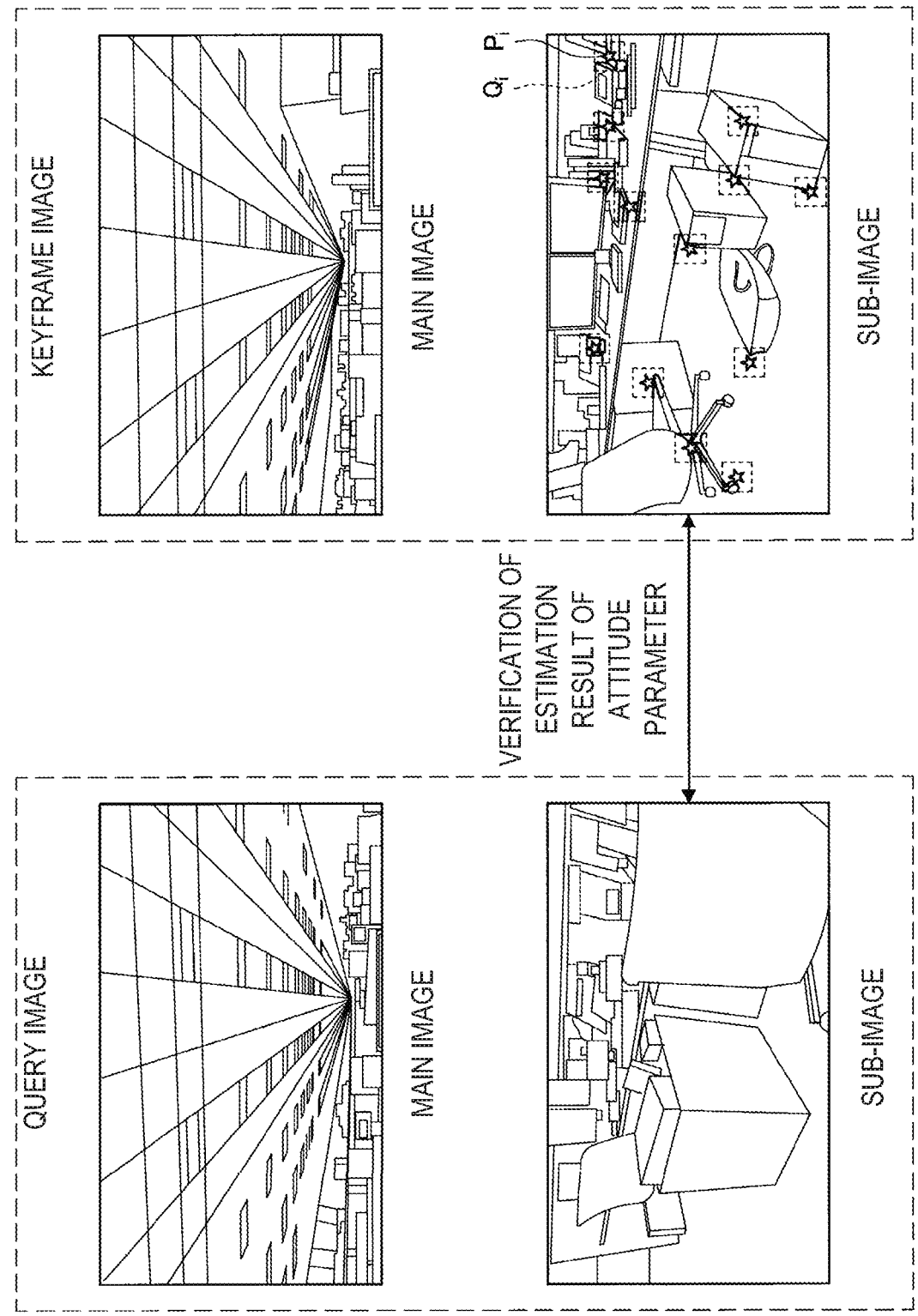
FIG. 10 is an explanatory diagram for explaining basic principle of the processes relating to estimation of attitude parameters in the information processing system according to the embodiment.

By utilizing the characteristics as described above, in the information processing system 1 according to the present embodiment, estimation results of the attitude parameters of the main image capturing unit 303 (eventually, the mobile object 300) based on the main images are verified by utilizing the corresponding sub-images. Specifically, as illustrated in FIG. 10, by matching of feature amounts respectively extracted from the sub-images captured as the query image and the keyframe image being performed, a likelihood of the estimation results of the attitude parameters based on the main images is verified.

Note that, in the following description, to explicitly distinguish between the main image and the sub-image captured as the keyframe images, the main image will be also referred to as a "keyframe main image", and the sub-image will be also referred to as a "keyframe sub-image". In a similar manner, to explicitly distinguish between the main image and the sub-image captured as the query images, the main image will be also referred to as a "query main image", and the sub-image will be also referred to as a "query sub-image".

Figure 11:
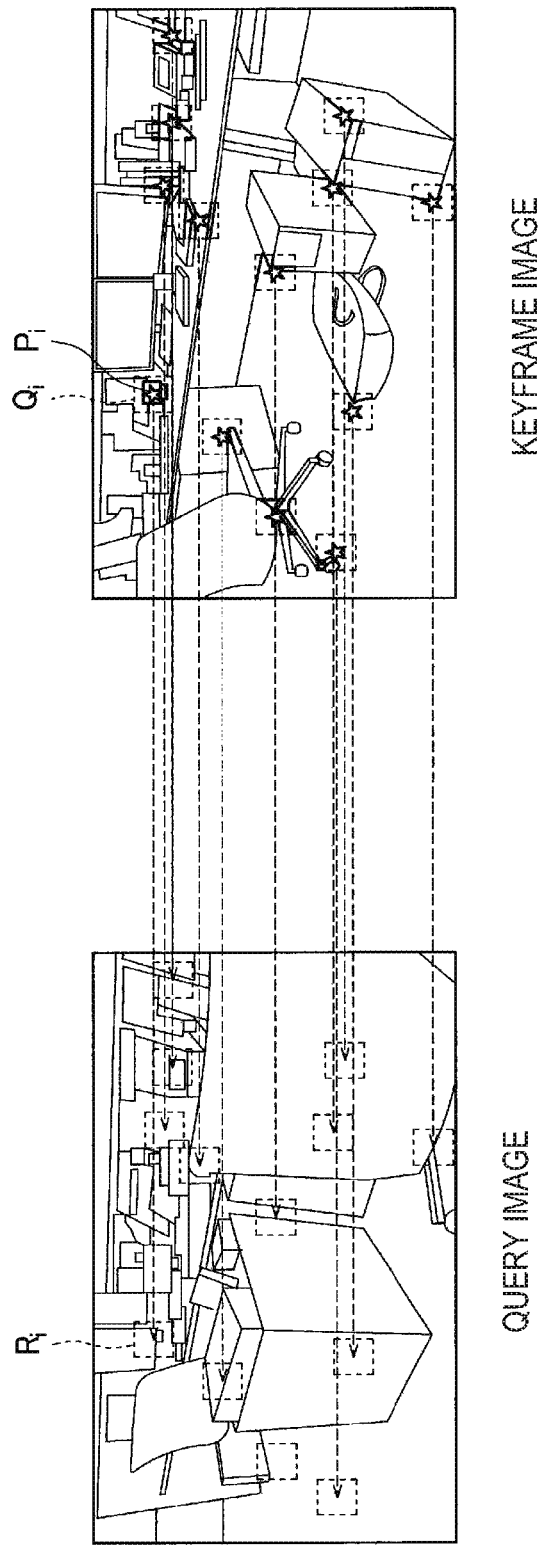
FIG. 11 is an explanatory diagram for explaining basic principle of the processes relating to estimation of attitude parameters in the information processing system according to the embodiment.

For example, FIG. 11 is an explanatory diagram for explaining an overview of a process relating to verification of the estimation results of the attitude parameters in the information processing system 1 according to the present embodiment. Specifically, in a case where attitude parameters when the query image and the keyframe image are respectively captured substantially match, local feature amounts extracted from the respective images substantially match between the keyframe sub-image and the query sub-image. That is, in such a case, at least a part of the query sub-image, a landmark $P_i$ which is practically the same as the landmark $P_i$ captured at least a part of the keyframe sub-image is captured.

Therefore, the information processing apparatus 100 first projects the respective landmarks $P_i$ on the query sub-image on the basis of information regarding the landmarks $P_i$ extracted from the keyframe sub-image, recorded as the keyframes, and the attitude parameters estimated from the query main image and the keyframe main image. Then, the information processing apparatus 100 extracts (calculates) local feature amounts of partial areas including points for the respective points in the query sub-image on which the respective landmarks $P_i$ are projected. For example, in FIG. 11, areas indicated with reference numerals $R_i$ indicate partial areas including points on which the landmarks $P_i$ are projected. Then, the information processing apparatus 100 performs matching between local feature amounts respectively calculated for the points projected on the query sub-image (that is, local feature amounts of the respective partial areas $R_i$) and local feature amounts corresponding to the landmarks $P_i$ which become projection sources of the points recorded as the keyframes (that is, local feature amounts of the respective partial areas $Q_i$). Then, in a case where the number of points which become inliers is equal to or larger than a threshold on the basis of a result of the matching, the information processing apparatus 100 determines that the estimation results of the attitude parameters based on the main images (that is, a result of localization) are correct.

Figure 12:
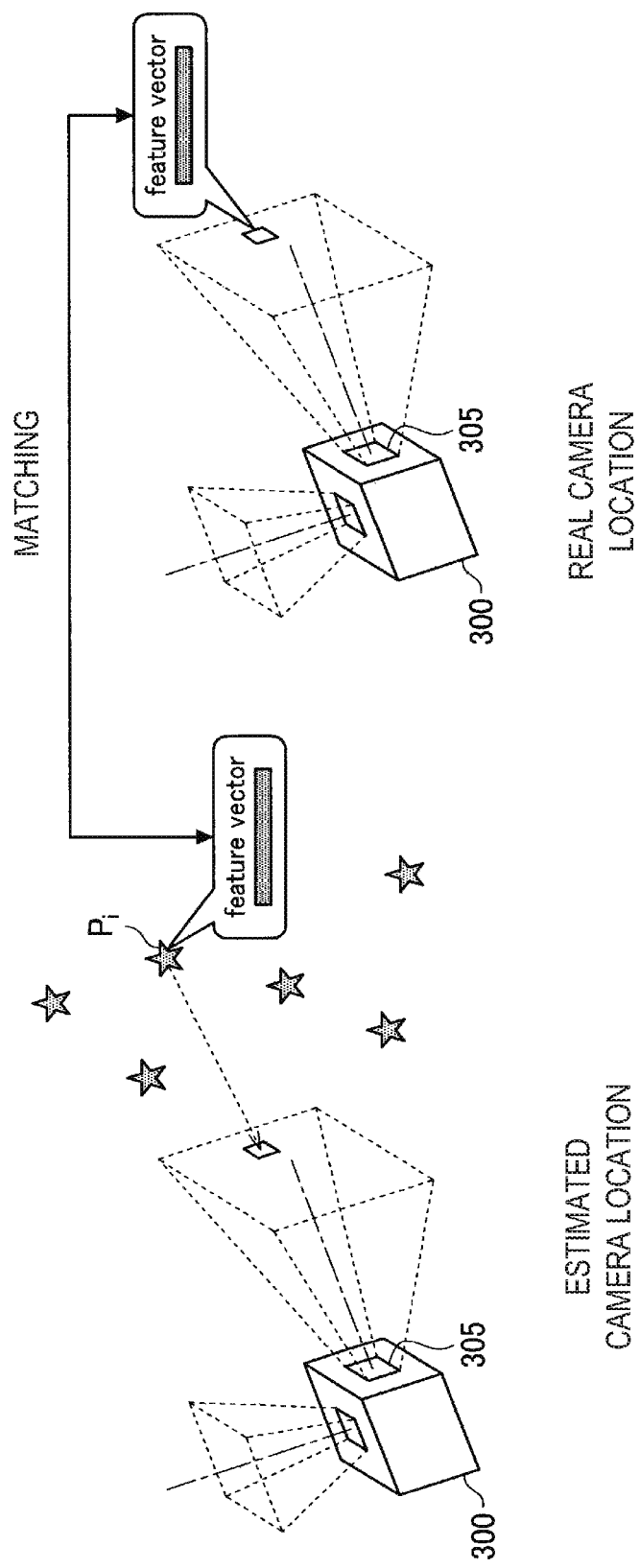
FIG. 12 is an explanatory diagram for explaining basic principle of the processes relating to estimation of attitude parameters in the information processing system according to the embodiment.

In summary, the information processing apparatus 100 estimates the location and the attitude of the mobile object 300 by comparing the feature amounts extracted from the sub-image captured by the sub-image capturing unit 305 with the feature amounts extracted from the sub-image included in the information registered as the keyframes. That is, as illustrated in FIG. 12, in a case where the feature amounts respectively extracted from the keyframe sub-image and the query sub-image substantially match, the information processing apparatus 100 recognizes that the estimation results of the location and the attitude of the mobile object 300 (that is, an estimated camera location)

substantially match an actual location and an actual attitude of the mobile object 300 (that is, a real camera location).

By the configuration as described above, in the information processing system 1 according to the present embodiment, it is possible to further improve accuracy relating to estimation of the location and the attitude (that is, attitude parameters) of the mobile object 300 in real space, and, eventually, it is possible to prevent erroneous estimation of the location and the attitude.

As described above, with reference to FIGS. 5 to 12, basic principle of processes relating to estimation of attitude parameters (in other words, self-location estimation) of an object which becomes a target (for example, a mobile object) in the information processing system according to the present embodiment has been described.

3.2. Functional Configuration

Figure 13:
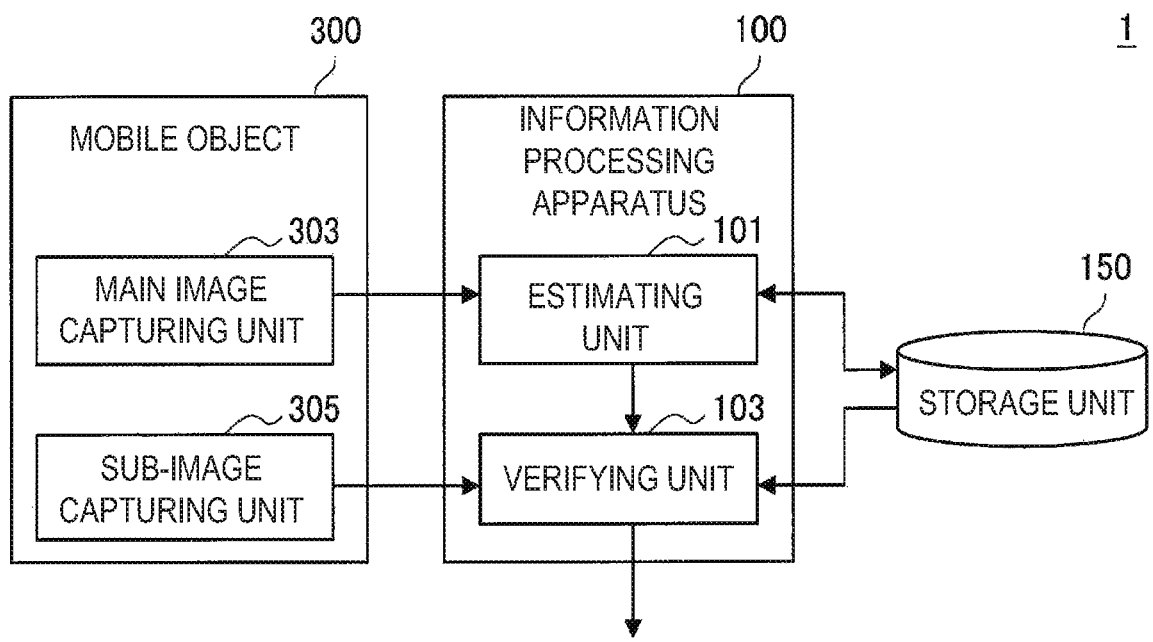
FIG. 13 is a block diagram illustrating an example of a functional configuration of the information processing system according to the embodiment.

Subsequently, an example of a functional configuration of the information processing system 1 according to the present embodiment will be described with reference to FIG. 13 while, particularly, attention is focused on functions relating to estimation of the attitude parameters in localization, or the like. FIG. 13 is a block diagram illustrating an example of the functional configuration of the information processing system 1 according to the present embodiment. Note that, in the present description, it is assumed that the information processing system 1 has a system configuration as illustrated in FIG. 1, and estimates the location and the attitude of the mobile object 300.

As illustrated in FIG. 13, the information processing system 1 according to the present embodiment includes an information processing apparatus 100, a mobile object 300, and a storage unit 150. Note that the information processing apparatus 100 and the mobile object 300 illustrated in FIG. 13 correspond to the information processing apparatus 100 and the mobile object 300 illustrated in FIG. 1. That is, the mobile object 300 includes a main image capturing unit 303 and a sub-image capturing unit 305. Note that, because the main image capturing unit 303 and the sub-image capturing unit 305 have been described above, detailed description will be omitted.

The storage unit 150 is a storage area for temporarily or permanently storing various kinds of data. For example, data respectively corresponding to the keyframes acquired through the above-described registration process may be stored in the storage unit 150. Further, the storage unit 150 is configured so that the stored various kinds of data can be individually read out. The storage unit 150 may be configured as, for example, a database.

A configuration of the information processing apparatus 100 will be described next. As illustrated in FIG. 13, the information processing apparatus 100 includes an estimating unit 101 and a verifying unit 103.

The estimating unit 101 acquires an image (that is, a main image) captured by the main image capturing unit 303 held in the mobile object 300 from the mobile object 300 (or the main image capturing unit 303). Note that the image corresponds to the query main image.

The estimating unit 101 extracts locations corresponding to the landmarks $P_i$ captured in the query main image as feature points by performing image analysis on the acquired query main image. Note that examples of algorithm for extracting feature points can include, for example, Harris corner detector, FAST corner detector, Difference of Gaussian, or the like.

The estimating unit 101 then sets partial areas $Q_i$ having a predetermined size including the feature points for the respective feature points extracted from the query main image, extracts (calculates) local feature amounts in the partial areas $Q_i$ and associates extraction results of the local feature amounts with the partial areas $Q_i$. Note that examples of algorithm for extracting local feature amounts can include, for example, SIFT, BRISK, ORB, or the like.

The estimating unit 101 then searches for and extracts keyframes in which information similar to the feature amounts extracted from the query main image (that is, the local feature amounts respectively corresponding to the partial areas $Q_i$ set for the respective landmarks $P_i$) is included as information of the keyframe main image from keyframes stored in the storage unit 150.

As a more specific example, the estimating unit 101 performs matching between each of the local feature amounts extracted from the query main image and each of the local feature amounts extracted from the keyframe main image included in the respective keyframes. The estimating unit 101 may then count the number of pairs for which similarity of the local feature amounts is equal to or greater than a threshold, set the number as a score, and extract the keyframes on the basis of a calculation result of the score. Further, as another example, the estimating unit 101 may set similarity of Bag of Words feature amounts created from the local feature amounts as a score, and extract the keyframes on the basis of a calculation result of the score.

The estimating unit 101 then estimates attitude parameters of the main image capturing unit 303 (eventually, the mobile object 300) by performing matching between the feature amounts extracted from the query main image and the feature amounts included as information of the keyframe main image in the extracted respective keyframes. Note that two-dimensional feature amount information and landmark information corresponding to the feature amounts are stored for the respective keyframes. Therefore, it becomes possible to perform matching (that is, 2D-3D matching) between two-dimensional feature amounts of the query main image and landmarks as the three-dimensional information held by the keyframes by performing matching between the two-dimensional feature amounts obtained from the query main image and the two-dimensional feature amounts held by the keyframes. Note that examples of means for estimating attitude parameters through 2D-3D matching can include, for example, a method based on PNP algorithm using an RANSAC framework.

Further, the estimating unit 101 may extract top N (N is an arbitrary natural number) keyframes including information with higher similarity to the feature amounts extracted from the query main image, from the keyframes stored in the storage unit 150. In a case where N keyframes are utilized for estimation of attitude parameters, N estimation results are obtained. Note that, also in a case where a plurality of estimation results is obtained, it is also possible to select an estimation result with the highest likelihood through verification by the verifying unit 103 which will be described later.

The estimating unit 101 then outputs the estimation results of the attitude parameters of the main image capturing unit 303 to the verifying unit 103. Note that, in a case where estimation of attitude parameters fails after matching is performed for all the keyframes stored in the storage unit 150, information indicating a failure in estimation of attitude parameters is output without verification being performed by the verifying unit 103 which will be described later.

The verifying unit 103 acquires an image (that is, a sub-image) captured by the sub-image capturing unit 305 held in the mobile object 300 from the mobile object 300 (or the sub-image capturing unit 305). Note that the image corresponds to the query sub-image. Further, the verifying unit 103 acquires the estimation results of the attitude parameters of the main image capturing unit 303 from the estimating unit 101. The verifying unit 103 then verifies a likelihood of the acquired estimation results of the attitude parameters by utilizing the acquired query sub-image. An example of a process relating to the verification will be described in more detail below.

First, the verifying unit 103 projects the respective landmarks $P_i$ on the acquired query sub-image on the basis of information regarding the landmarks $P_i$ extracted from the keyframe sub-image, included in the keyframes corresponding to the acquired estimation results of the attitude parameters, and the acquired attitude parameters. Note that, hereinafter, points at which the landmarks $P_i$ extracted from the keyframe sub-image are projected in the query sub-image will be also referred to as "projection points".

Then, the verifying unit 103 extracts (calculates) local feature amounts of partial areas $R_i$ including the projection points for the respective projection points in the query sub-image. Further, the verifying unit 103 calculates similarity between the local feature amounts calculated for the respective projection points in the query sub-image and the local feature amounts corresponding to the landmarks $P_i$ which become projection sources of the projection points, included in the keyframes corresponding to the estimation results of the attitude parameters. The verifying unit 103 then counts projection points for which similarity of the local feature amounts is equal to or greater than a threshold among the respective projection points in the query sub-image obtained by projecting the respective landmarks $P_i$, as inliers. Note that examples of the feature amounts and similarity to be used for the process can include, for example, an SAD score which uses brightness of the image itself as the feature amounts, an NCC score, or the like.

Further, at this time, the verifying unit 103 may correct feature amounts of the corresponding image (that is, local feature amounts of the respective portions) assuming that at least one of the query sub-image or the keyframe sub-image is transformed, in accordance with the estimation results of the attitude parameters of the main image capturing unit 303. In this case, the verifying unit 103 may calculate the above-described similarity on the basis of the corrected feature amounts.

The verifying unit 103 then determines that the estimation results of the corresponding attitude parameters are appropriate in a case where the number of inliers counted in accordance with the calculation results of similarity corresponding to the respective projection points becomes equal to or larger than a threshold. The verifying unit 103 then outputs the estimation results to a predetermined output destination in a case where it is determined that the estimation results of the attitude parameters are appropriate.

Note that, in a case where a plurality of estimation results of the attitude parameters is acquired, the verifying unit 103 may, for example, select estimation results with higher reliability and execute the above-described process relating to verification. Further, as another example, the verifying unit 103 may execute the above-described process relating to verification on each of the plurality of estimation results and output an estimation result with the highest likelihood as the estimation results of the attitude parameters of the main image capturing unit 303.

Note that the above-described functional configuration of the information processing system 1 according to the present embodiment is merely an example, and the functional configuration of the information processing system 1 is not necessarily limited to the example illustrated in FIG. 13 if the above-described functions of the respective components are implemented. As a specific example, at least two or more of the information processing apparatus 100, the storage unit 150, and the mobile object 300 may be integrally configured. Further, among the respective components included in the information processing apparatus 100, part of the components may be provided at an apparatus different from the information processing apparatus 100. Further, the respective functions of the information processing apparatus 100 may be implemented by a plurality of apparatuses coordinating with each other.

Further, while, in the above-described example, an example has been described where information regarding the feature amounts extracted from the keyframe image (for example, information regarding the landmarks $P_i$ and information regarding the local feature amounts corresponding to the landmarks $P_i$) is registered in advance as the keyframes, the information registered as the keyframes is not necessarily limited to the above-described example. As a specific example, the keyframe images themselves may be registered as the keyframes. In this case, the above-described feature amounts may be extracted from, for example, the keyframe images (that is, the keyframe main image and the keyframe sub-image) registered as the keyframes upon estimation of attitude parameters or upon verification of the estimation results. At least one of the query image or the keyframe image may be transformed in accordance with the estimation results of the attitude parameters of the main image capturing unit 303 upon matching between the query image and the keyframe image.

An example of the functional configuration of the information processing system 1 according to the present embodiment, has been described above with reference to FIG. 13 while, particularly, attention is focused on functions relating to estimation of attitude parameters in localization, or the like.

3.3. Processes

Figure 14:
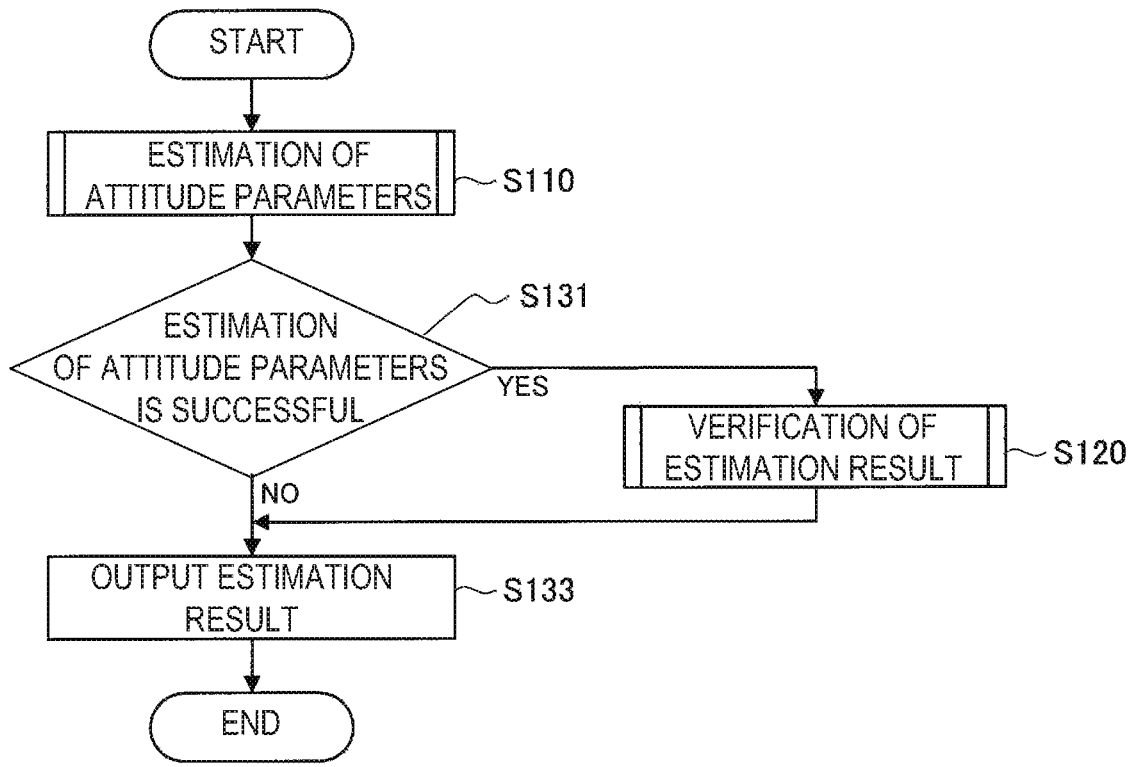
FIG. 14 is a flowchart illustrating an example of a flow of a series of processes of the information processing system according to the embodiment.
Figure 15:
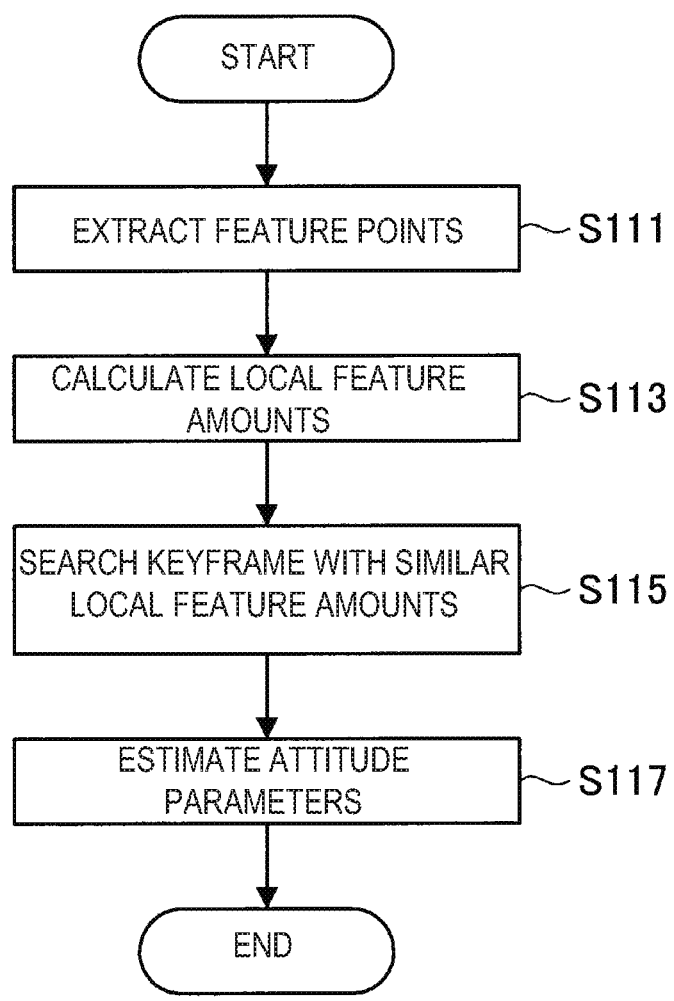
FIG. 15 is a flowchart illustrating an example of a flow of a series of processes of the information processing system according to the embodiment.
Figure 16:
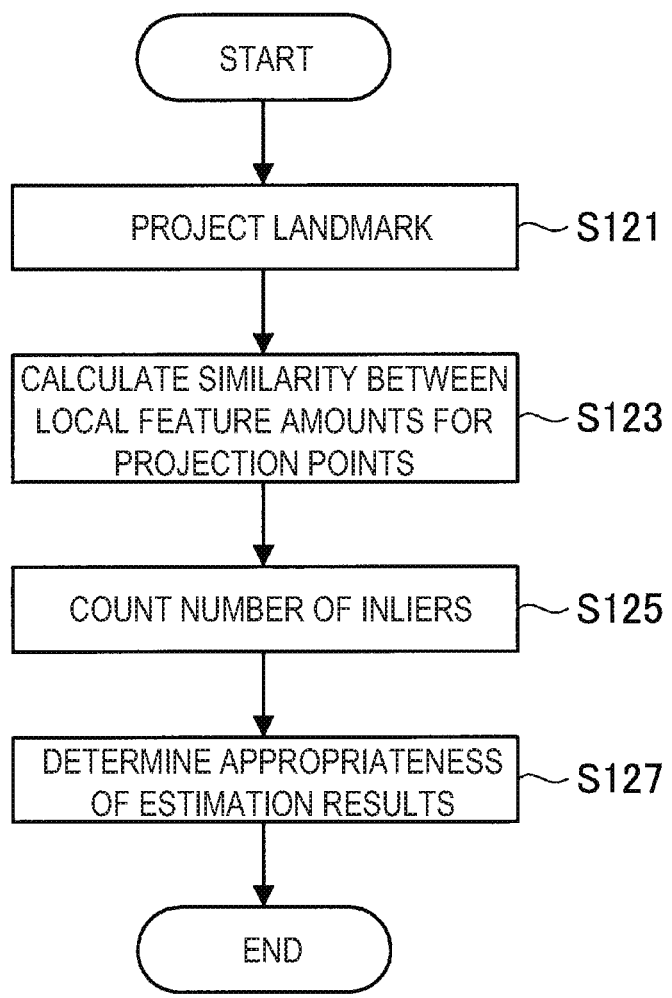
FIG. 16 is a flowchart illustrating an example of a flow of a series of processes of the information processing system according to the embodiment.

Subsequently, an example of flow of a series of processes of the information processing system 1 according to the present embodiment will be described with reference to FIG. 14 to FIG. 16 while, particularly, attention is focused on functions relating to estimation of attitude parameters in localization, or the like. FIG. 14 to FIG. 16 are flowcharts illustrating flow of a series of processes of the information processing system 1 according to the present embodiment.

Schematic flow of a series of processes relating to estimation of attitude parameters will be described first with reference to FIG. 14.

As illustrated in FIG. 14, the information processing apparatus 100 (the estimating unit 101) acquires an image (that is, a query main image) captured by the main image capturing unit 303 held in the mobile object 300 from the mobile object 300. The information processing apparatus 100 then extracts feature amounts from the acquired query main image and estimates attitude parameters of the mobile object 300 by comparing the extracted feature amounts with information regarding the feature amounts included in the keyframes stored in a predetermined storage area (the storage unit 150) (S110).

The information processing apparatus 100 (the verifying unit 103) then verifies the estimation results in a case where estimation of attitude parameters of the mobile object 300 is successful (S131: Yes). Specifically, the information processing apparatus 100 (the verifying unit 103) acquires an image (that is, a query sub-image) captured by the sub-image capturing unit 305 held in the mobile object 300 from the mobile object 300. The information processing apparatus 100 then extracts feature amounts from the acquired query sub-image and verifies a likelihood of the estimation results by comparing the extracted feature amounts with information regarding the feature amounts included in the keyframes corresponding to the estimation results of the attitude parameters of the mobile object 300 (S120).

The information processing apparatus 100 then outputs the estimation results of the attitude parameters of the mobile object 300 to a predetermined output destination on the basis of the above-described verification result (S133).

Note that, in a case where estimation of the attitude parameters of the mobile object 300 fails in the process indicated with a reference numeral S110 (S131: No), the information processing apparatus 100 outputs information indicating a failure in estimation of the attitude parameters without executing a process relating to verification indicated with a reference numeral S120 (S133).

As described above, schematic flow of a series of processes relating to estimation of attitude parameters has been described with reference to FIG. 14.

Subsequently, an example of the process relating to estimation of attitude parameters indicated with the reference numeral S110 in FIG. 14 will be described with reference to FIG. 15.

The information processing apparatus 100 (the estimating unit 101) first extracts locations corresponding to the landmarks $P_i$ captured in the query main image as feature points by performing image analysis on the acquired query main image (S111).

The information processing apparatus 100 (the estimating unit 101) then sets partial areas $Q_i$ including the feature points for the respective feature points extracted from the query main image, extracts (calculates) local feature amounts in the partial areas $Q_i$ and associates extraction results of the local feature amounts with the partial areas $Q_i$ (S113).

The information processing apparatus 100 (the estimating unit 101) then searches for and extracts keyframes in which information similar to the feature amounts extracted from the query main image is included as information of the keyframe main image from keyframes stored in the storage unit 150 (S115).

The information processing apparatus 100 (the estimating unit 101) then estimates attitude parameters of the mobile object 300 by performing matching between the feature amounts extracted from the query main image and the feature amounts included in the extracted respective keyframes as information of the keyframe main image (S117).

An example of the process relating to estimation of the attitude parameters has been described above with reference to FIG. 15.

Subsequently, an example of the process relating to verification of the estimation result of attitude parameters indicated with the reference numeral S120 in FIG. 14 will be described with reference to FIG. 16.

First, the information processing apparatus 100 (the verifying unit 103) projects the respective landmarks $P_i$ on the acquired query sub-image on the basis of information regarding the landmarks $P_i$ extracted from the keyframe sub-image, included in the keyframes corresponding to the estimation results of the attitude parameters, and the estimation result of the attitude parameters (S121).

The information processing apparatus 100 (the verifying unit 103) then extracts (calculates) local feature amounts of the partial areas including the projection points for the respective projection points in the query sub-image. Further, the information processing apparatus 100 calculates similarity between the local feature amounts calculated for the respective projection points in the query sub-image and the local feature amounts corresponding to the landmarks $P_i$ which become projection sources of the projection points, included in the keyframes corresponding to the estimation results of the attitude parameters (S123).

The information processing apparatus 100 (the verifying unit 103) then counts projection points for which similarity of the local feature amounts is equal to or greater than a threshold among the respective projection points in the query sub-image on which the respective landmarks $P_i$ are projected, as inliers (S125).

The information processing apparatus 100 (the verifying unit 103) then determines that the estimation results of the corresponding attitude parameters are appropriate in a case where the number of inliers counted in accordance with the calculation results of similarity corresponding to the respective projection points becomes equal to or larger than a threshold (S127).

An example of the process relating to verification of the estimation result of the attitude parameters has been described above with reference to FIG. 15.

3.4. Modified Examples

Subsequently, modified examples of the information processing system 1 according to the present embodiment will be described.

Modified Example 1: Example of Process Relating to Verification of Estimation Results of Attitude Parameters First, as modified example 1, an example of a process relating to verification of the estimation results of the attitude parameters will be described. In the above-described example, the information processing apparatus 100 verifies the likelihood of the estimation results of the attitude parameters through matching between the feature amounts extracted from the query sub-image and the feature amounts (that is, the feature amounts extracted from the keyframe sub-image) registered in advance as the keyframes. Meanwhile, if it is possible to verify a likelihood of the estimation results of the attitude parameters on the basis of the sub-image captured by the sub-image capturing unit 305, the method is not particularly limited.

As a specific example, the information processing apparatus 100 may verify a likelihood of the estimation results of the attitude parameters by comparing global feature amounts of the respective images between the query sub-image and the keyframe sub-image. Specifically, the information processing apparatus 100, for example, extracts Bag of Words feature amounts, color histogram feature amounts, or the like, respectively from the query sub-image and the keyframe sub-image as global feature amounts. The information processing apparatus 100 may then judge that the estimation results of the attitude parameters are appropriate in a case where similarity of the feature amounts extracted from the respective images exceeds a threshold.

Further, as another example, the information processing apparatus 100 may utilize discriminators generated in accordance with so-called machine learning in verification of the estimation results of the attitude parameters. In this case, for example, learning of the discriminators is performed using the images (that is, the keyframe images) observed near the location and the attitude as positive data and using images which should not be observed as negative data for each of the locations and the attitudes (that is, attitude parameters) of the respective image capturing units registered as the keyframes. Then, the discriminators are recorded in a predetermined storage area (for example, the storage unit 150) in association with the locations and the attitudes of the image capturing units. Further, to verify the estimation results of the attitude parameters, the information processing apparatus 100 only has to search for a discriminator associated with the location and the attitude which substantially match the estimation results of the attitude parameters and input the query sub-image captured by the sub-image capturing unit 305 to the discriminator.

An example of the process relating to verification of the estimation result of the attitude parameters has been described as modified example 1.

Figure 17:
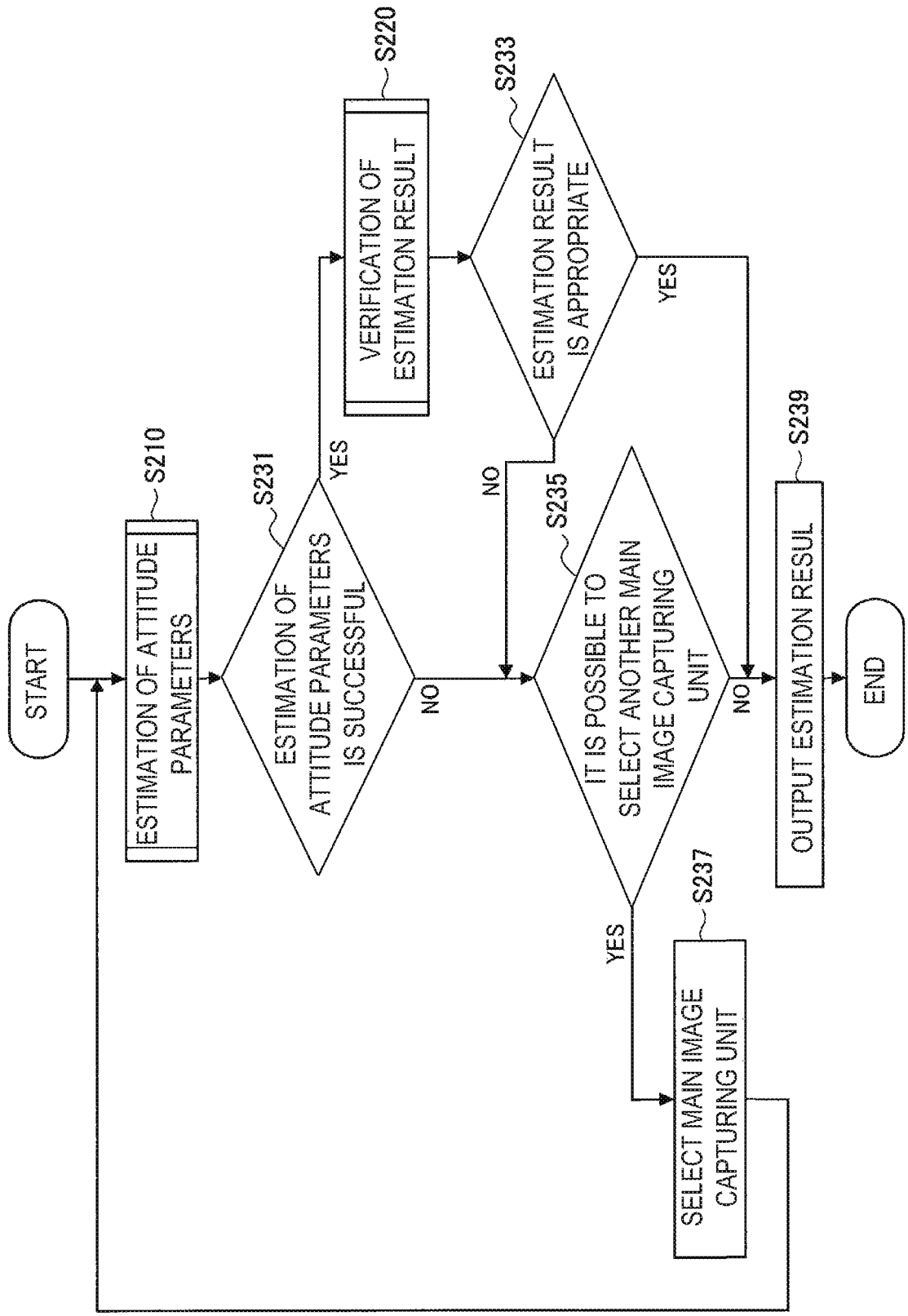
FIG. 17 is a flowchart illustrating an example of a flow of a series of processes of the information processing system according to modified example 2.

Modified Example 2: Example of Control in a Case where a Plurality of Main Image Capturing Units is Set Subsequently, as modified example 2, an example of control relating to estimation of the attitude parameters of the mobile object 300 in a case where a plurality of main image capturing units 303 is set will be described with reference to FIG. 17. FIG. 17 is a flowchart illustrating an example of flow of a series of processes of an information processing system 1 according to modified example 2, and, particularly, illustrates an example of a process relating to verification of the estimation results of the attitude parameters in localization, or the like.

As illustrated in FIG. 17, the information processing apparatus 100 selects one of the plurality of main image capturing units 303 held in the mobile object 300 and acquires an image (that is, a query main image) captured by the selected main image capturing unit 303 from the mobile object 300. The information processing apparatus 100 then estimates attitude parameters of the mobile object 300 on the basis of the acquired query main image (S210). Note that, because a process relating to estimation of the attitude parameters of the mobile object 300 is similar to the process described above with reference to FIG. 15, detailed description will be omitted.

The information processing apparatus 100 then verifies the estimation results (S220) in a case where estimation of the attitude parameters of the mobile object 300 is successful (S231: Yes). Note that, because a process relating to verification of the estimation results of the attitude parameters of the mobile object 300 is similar to the process described above with reference to FIG. 16, detailed description will be omitted.

The information processing apparatus 100 then outputs the estimation results to a predetermined output destination (S239) in a case where it is determined that the estimation results of the attitude parameters of the mobile object 300 are appropriate (S233: Yes).

Meanwhile, in a case where it is determined that the estimation results of the attitude parameters of the mobile object 300 are not appropriate (S233: No), the information processing apparatus 100 confirms whether or not it is possible to select another main image capturing unit 303 which is not utilized for estimation of the attitude parameters (S235). In a case where it is possible to select another main image capturing unit 303 (S235: Yes), the information processing apparatus 100 newly selects another main image capturing unit 303 (S237) and executes processes from the process relating to estimation of the attitude parameters (S210) again. Further, in a case where it is difficult to select another main image capturing unit 303 (S235: No), the information processing apparatus 100 outputs information indicating a failure in estimation of attitude parameters (S239).

In addition, in a case where the estimation of the attitude parameters of the mobile object 300 fails in the process indicated with the reference numeral S210 (S231: No), the information processing apparatus 100 confirms whether or not it is possible to select another main image capturing unit 303 which is not utilized for estimation of the attitude parameters (S235). Then, in a case where it is possible to select another main image capturing unit 303 (S235: Yes), the information processing apparatus 100 newly selects another main image capturing unit 303 (S237) and executes processes from the process relating to estimation of the attitude parameters (S210) again. Further, in a case where it is difficult to select another main image capturing unit 303 (S235: No), the information processing apparatus 100 outputs information indicating a failure in estimation of attitude parameters (S239).

As described above, in a case where appropriate results cannot be obtained as the estimation results of the attitude parameters of the mobile object 300, the information processing apparatus 100 estimates the attitude parameters again while sequentially switching the main image capturing unit 303 to be utilized for estimation of the attitude parameters. By such control, even in a case where estimation of the attitude parameters utilizing part of the main image capturing units 303 fails, the information processing apparatus 100 can estimate the attitude parameters again by utilizing other main image capturing units 303. Therefore, according to the information processing system according to modified example 2, it is possible to further reduce a probability of a failure in estimation of attitude parameters.

Further, according to the information processing system according to modified example 2, all the main image capturing units 303 are not necessarily utilized for estimation of attitude parameters of the mobile object 300. Therefore, compared to a case where all of a plurality of main image capturing units 303 are always utilized for estimation of attitude parameters, it is possible to reduce processing load relating to the estimation.

An example of control relating to estimation of attitude parameters of the mobile object 300 in a case where a plurality of main image capturing units 303 is set has been described above as modified example 2 with reference to FIG. 17.

Modified Example 3: Example of Control in a Case where a Plurality of Sub-Image Capturing Units is Set Subsequently, an example of control relating to verification of the estimation results of the attitude parameters of the mobile object 300 in a case where a plurality of sub-image capturing units 305 is set will be described.

In this case, the information processing apparatus 100, for example, projects the landmarks $P_i$ extracted from the keyframe sub-image respectively on the query sub-images captured by the plurality of sub-image capturing units 305 on the basis of information included in the keyframes corresponding to the estimation results of the attitude parameters and the estimation results of the attitude parameters. The information processing apparatus 100 then performs determination of inliers for the respective projection points for each of the plurality of query sub-images and determines whether the estimation results of the attitude parameters are appropriate in accordance with the number of inliers. Then, in a case where the number of query sub-images for which it is determined that the estimation results of the attitude parameters are appropriate among the above-described plurality of query sub-images, is equal to or larger than a threshold, the information processing apparatus 100 only has to output the estimation results of the attitude parameters to a predetermined output destination.

As described above, an example of control relating to verification of the estimation results of the attitude parameters of the mobile object 300 in a case where a plurality of sub-image capturing units 305 is set has been described.

Figure 18:
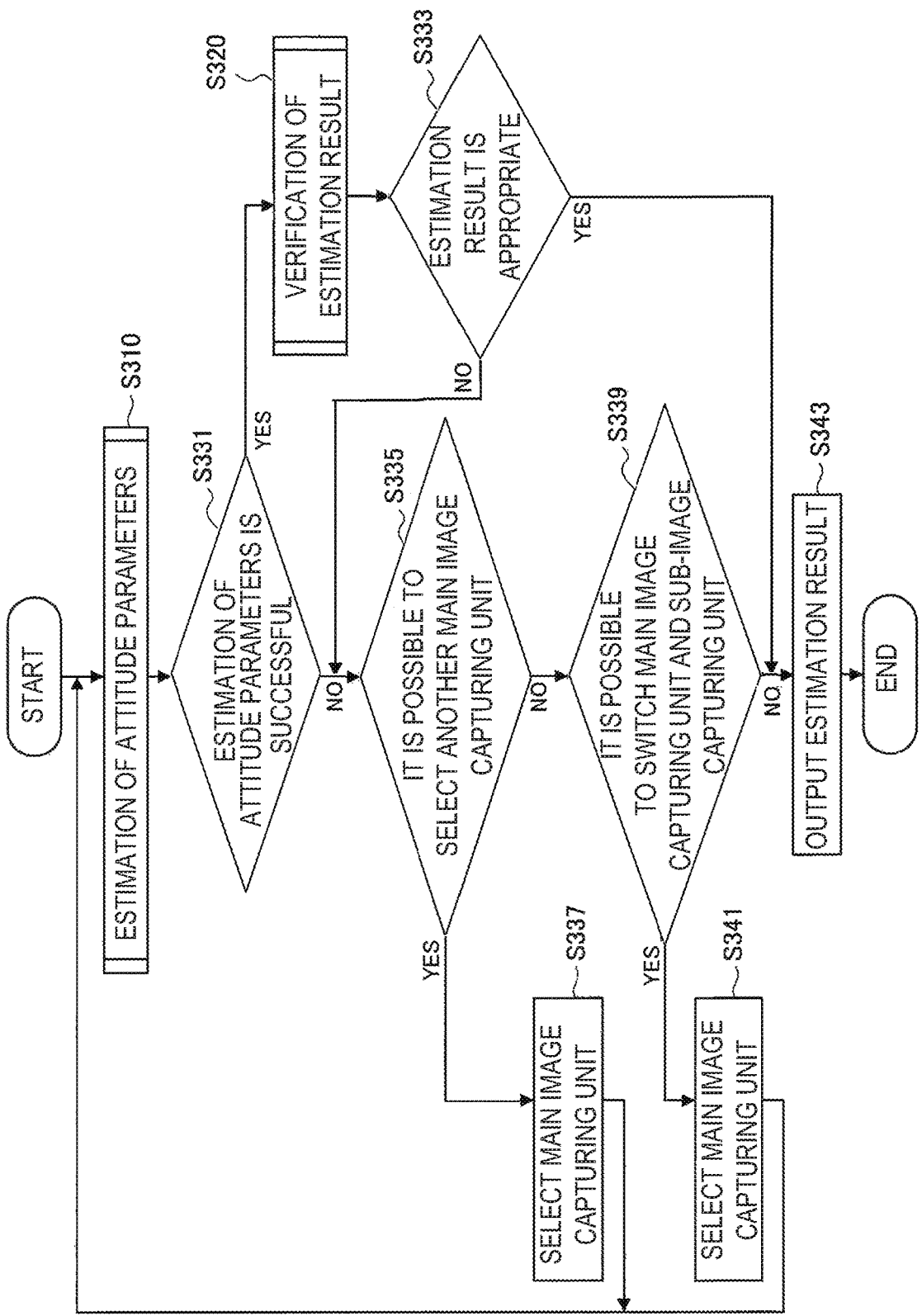
FIG. 18 is a flowchart illustrating an example of a flow of a series of processes of the information processing system according to modified example 4.

Modified Example 4: Example of Control while Switching and Utilizing Roles of Main Image Capturing Unit and Sub-Image Capturing Unit Subsequently, as modified example 4, an example of control in a case where roles of the main image capturing unit 303 and the sub-image capturing unit 305 are selectively switched and utilized in accordance with the estimation results of the attitude parameters and the estimation results will be described with reference to FIG. 18. FIG. 18 is a flowchart illustrating an example of flow of a series of processes of an information processing system 1 according to modified example 4, and, particularly, illustrates an example of a process relating to verification of the estimation results of the attitude parameters in localization, or the like.

Note that FIG. 18 illustrates an example in a case where a plurality of main image capturing units 303 is set in a similar manner to the information processing system according to modified example 2. That is, in FIG. 18, processes indicated with reference numerals S310, S320, and S331 to S337 are similar to the processes indicated with reference numerals S210, S220, and S231 to S237 in FIG. 17. Therefore, in the following description, description will be provided while attention is mainly focused on processes indicated with reference numerals S339, S341, and S343, and detailed description of other processes will be omitted.

In a case where estimation of attitude parameters fails (S331: No), or in a case where it is determined that the estimation results of the attitude parameters are not appropriate (S333: No), the information processing apparatus 100 confirms whether or not it is possible to select another main image capturing unit 303 which is not utilized for estimation of the attitude parameters (S335). Then, in a case where it is difficult to select another main image capturing unit 303 (S335: No), the information processing apparatus 100 determines whether or not it is possible to switch between the main image capturing unit 303 and the sub-image capturing unit 305 (that is, whether or not it is possible to switch roles of the main image capturing unit 303 and the sub-image capturing unit 305) (S339).

In a case where it is possible to switch between the main image capturing unit 303 and the sub-image capturing unit 305 (S339: Yes), the information processing apparatus 100 selects (sets) an image capturing unit which has been set as the sub-image capturing unit 305 previously as a new main image capturing unit 303. Further, the information processing apparatus 100 selects (sets) an image capturing unit which has been set as the main image capturing unit 303 previously as a new sub-image capturing unit 305 (S341). The information processing apparatus 100 then executes processes from the process relating to estimation of attitude parameters (S310) again.

Note that, in a case where it is difficult to switch between the main image capturing unit 303 and the sub-image capturing unit 305 (S339: No), the information processing apparatus 100 outputs information indicating a failure in estimation of attitude parameters (S343).

An example of control in a case where roles of the main image capturing unit 303 and the sub-image capturing unit 305 are selectively switched and utilized in accordance with the estimation results of the attitude parameters and the estimation results has been described above as modified example 4 with reference to FIG. 18.

Modified Example 5: Example of Method of Self-Location Estimation

Subsequently, as modified example 5, an example in a case where scores based on features unique to images for the respective images captured by the respective image capturing units are calculated, and self-location estimation is performed utilizing the scores will be described as an example of a method of self-location estimation. Note that, in the following description, the above-described scores will be also referred to as "uniqueness scores". Further, in the present description, to make it easier to understand features of the information processing system according to modified example 5, description will be provided assuming that the keyframe images themselves are recorded in a predetermined storage area as the keyframes.

First, a process relating to calculation of the uniqueness scores will be described. The information processing apparatus 100 calculates uniqueness scores in advance for the respective series of keyframe images (that is, the keyframe main image and the keyframe sub-image) registered as the keyframes. The uniqueness scores are scores indicating how many unique image features the respective images have with respect to other images.

For example, in a case where similarity between an image i and an image j which are different from each other is set as $S\_ij$, and a uniqueness score of the image i is set as $U\_i$, the similarity $S\_ij$ and the uniqueness score $U\_i$ can be expressed with equations indicated below as (equation 1) and (equation 2).

[Math. 1]

$$S\_ij = \text{Similarity}(I\_i, I\_j) \quad \text{(equation 1)}$$

$$U\_i = \frac{1}{\sum_{k=0}^{n} \text{Similarity}(I\_i, I\_n)} \quad \text{(equation 2)}$$

In the above-described (equation 1) and (equation 2), variables $I\_i$ and $I\_j$ indicate feature amounts of the respective images i and j. Further, a Similarity function corresponds to a function for calculating similarity in input information (feature amounts of the images). Note that the similarity between the images may be calculated, for example, on the basis of global feature amounts such as Bag of Words which indicates features of an entire image.

Further, as another example, similarity between two images may be calculated by performing matching of the local feature amounts between the two images and counting the number of inliers.

Subsequently, an example of self-location estimation utilizing the above-described uniqueness scores will be described. For example, the information processing apparatus 100 searches for an image similar to the query images captured by the respective image capturing units (for example, the main image capturing unit 303 and the sub-image capturing unit 305) from keyframe images registered as the keyframes. The information processing apparatus 100 then specifies a keyframe image having the highest uniqueness score among the keyframe images searched for the respective query images. The information processing apparatus 100 then sets the query image corresponding to the specified keyframe image as a query main image, sets other query images as query sub-images and performs estimation of attitude parameters and verification of the estimation results of the attitude parameters.

By control as described above, according to the information processing system according to modified example 5, it becomes possible to perform self-location estimation by utilizing an image which is expected to have more unique features, so that it is also possible to further improve accuracy of the self-location estimation. Further, according to the information processing system according to modified example 5, for example, it becomes possible to prevent occurrence of a situation where images which are likely to be images obtained by capturing similar scenes such as images in which repetitive patterns are captured are utilized for self-location estimation, because of the characteristic as described above.

An example in a case where scores based on features unique to images are calculated for the respective images captured by the respective image capturing units and self-location estimation is performed by utilizing the scores as an example of a method of self-location estimation has been described above as modified example 5.

Modified Example 6: Example of Control Relating to Selection of Sub-Image Capturing Unit Subsequently, as modified example 6, an example of control relating to selection of the sub-image capturing unit 305 to be utilized for verification of the estimation results of the attitude parameters in a case where a plurality of sub-image capturing units 305 is set will be described. Note that, in modified example 6, an example in a case where the mobile object 300 is configured as a vehicle, and the location and the attitude (that is, attitude parameters) of the vehicle in real space are estimated by utilizing image capturing units mounted on the vehicle will be described.

For example, in an environment with a relatively narrow field of view such as an urban area, change of a scene which is captured by an image capturing unit facing in a direction horizontally rotated by 90 degrees from a traveling direction (that is, a horizontal direction of the vehicle) in accordance with movement of the vehicle is larger than that captured by an image capturing unit facing the traveling direction of the vehicle. That is, it is expected that a change amount of a scene captured as an image with respect to a change amount of attitude parameters of the vehicle becomes greater in the image captured by the image capturing unit facing the horizontal direction of the vehicle than in the image captured by the image capturing unit facing the traveling direction of the vehicle. Therefore, for example, the respective image capturing units facing the horizontal direction of the vehicle among the plurality of image capturing units mounted on the vehicle may be utilized as the main image capturing unit 303 and the sub-image capturing unit 305. Specifically, an image capturing unit facing one of the horizontal direction of the vehicle is preferably set as the main image capturing unit 303, and an image capturing unit facing the other of the horizontal direction (that is, an image capturing unit facing an opposite direction to a direction of the main image capturing unit 303) is preferably set as the sub-image capturing unit 305.

By the control as described above, according to the information processing system 1 according to modified example 6, for example, under the condition that the mobile object 300 is configured as a vehicle, it becomes possible to further improve accuracy relating to estimation of attitude parameters of the mobile object 300 and accuracy relating to verification of the estimation results.

An example of control relating to selection of the sub-image capturing unit 305 to be utilized for verification of estimation results of attitude parameters in a case where a plurality of sub-image capturing units 305 is set has been described above as modified example 6.

Figure 19:
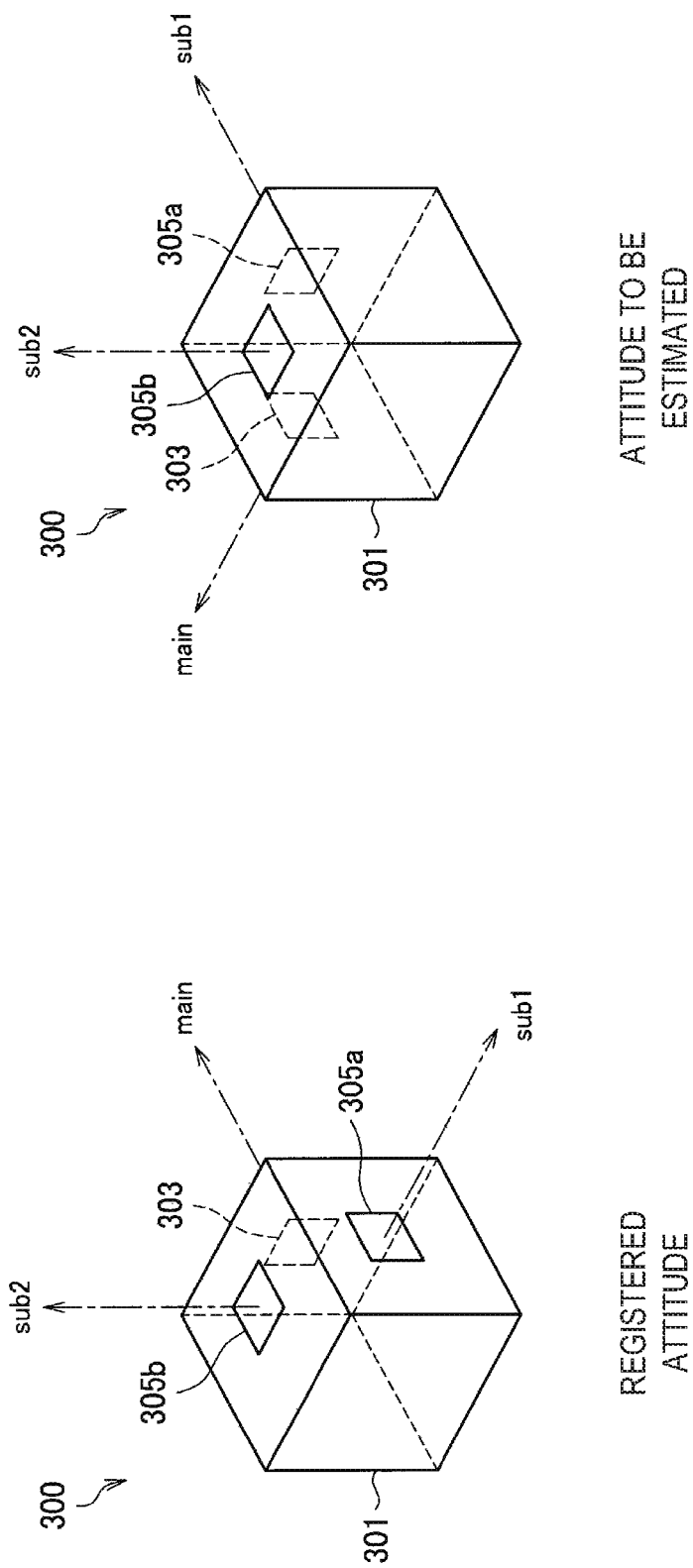
FIG. 19 is an explanatory diagram for describing an overview of an information processing system according to modified example 7.

Modified Example 7: Example of Control Relating to Selection of Sub-Image Capturing Unit Subsequently, as modified example 7, an example of control relating to selection of the sub-image capturing unit 305 to be utilized for verification of estimation results of attitude parameters in a case where a plurality of sub-image capturing units 305 is set will be described with reference to FIG. 19. FIG. 19 is an explanatory diagram for explaining an overview of an information processing system according to modified example 7.

In self-location estimation utilizing images captured by the image capturing units, a field of view which is common in a certain degree between the image registered in a database, or the like, and the image acquired upon estimation is required, and estimation results typically become more robust as the common field of view is wider. This will apply to verification of the estimation results of the attitude parameters utilizing the sub-image capturing unit 305. In the present modified example, an example of a method for selecting the sub-image capturing unit 305 in view of such circumstances will be described. Note that, in the present embodiment, the above-described keyframe image corresponds to the above-described image registered in the database, or the like, and the above-described query image corresponds to the above-described image captured upon estimation. Further, the storage unit 150 described with reference to FIG. 13 corresponds to the above-described database, or the like.

As described above, in the information processing system 1 according to an embodiment of the present disclosure, the attitude parameters of the main image capturing unit 303 (eventually, the mobile object 300) are estimated on the basis of the main image captured by the main image capturing unit 303. Further, if calibration is performed for relative positional relationship of the respective image capturing units held in the mobile object 300, it is also possible to estimate (calculate) attitude parameters of the image capturing unit (for example, the sub-image capturing unit 305) other than the main image capturing unit 303 on the basis of the estimation results of the attitude parameters.

Therefore, in the present modified example, the information processing apparatus 100 compares information indicating the attitude of the sub-image capturing unit 305 based on the information registered as the keyframes with the information indicating the attitude of the sub-image capturing unit 305 which is a target for estimation of the attitude parameters for each of the plurality of sub-image capturing units 305. Note that, in the following description, the information indicating an attitude of an object such as the sub-image capturing unit 305 will be also referred to as "rotation parameters". The information processing apparatus 100 then selects a sub-image capturing unit 305 for which a value of an angular difference between a vector in an optical axis direction of the image capturing unit calculated from the corresponding rotation parameters and a vector in optical axis direction of the image capturing unit calculated on the basis of the information registered as the keyframes is closer among the plurality of sub-image capturing units 305 on the basis of the comparison result.

For example, in FIG. 19, a left part schematically illustrates the attitude of the mobile object 300 in accordance with the information registered as the keyframes. Further, a left part schematically illustrates an actual attitude of the mobile object 300 which is a target for estimation of attitude parameters. Note that, in the example illustrated in FIG. 19, a main image capturing unit 303, and a plurality of sub-image capturing units 305a and 305b are held in a chassis 301 of the mobile object 300. Further, the main image capturing unit 303, the sub-image capturing unit 305a, and the sub-image capturing unit 305b are each held so as to capture images in directions different from each other on the basis of the mobile object 300. That is, vectors in the optical axis directions of the image capturing units are set so as to capture images in directions different from each other. For example, in FIG. 19, a direction indicated as "main" indicates a direction in which the main image capturing unit 303 captures an image. Further, a direction indicated as "sub1" indicates a direction in which the sub-image capturing unit 305a captures an image. Still further, a direction indicated as "sub2" indicates a direction in which the sub-image capturing unit 305b captures an image.

That is, in a case of the example illustrated in FIG. 19, the information processing apparatus 100 compares the vector in the optical axis direction of the image capturing unit calculated from the rotation parameters of the image capturing unit based on the information registered as the keyframes with the vector in the optical axis direction of the image capturing unit calculated from the rotation parameter of the image capturing unit calculated in accordance with the estimation results of the attitude parameters for each of the sub-image capturing units 305a and 305b. The information processing apparatus 100 then selects a sub-image capturing unit 305 for which a value of an angular difference between the above-described vector in the optical axis direction of the image capturing unit in accordance with the estimation results of the attitude parameters and the above-described vector in the optical axis direction of the image capturing unit based on the information registered as the keyframes is closer among the sub-image capturing units 305a and 305b in accordance with the above-described comparison result.

For example, in the example illustrated in FIG. 19, concerning the sub-image capturing unit 305a, an image capturing direction sub1 indicated by the information registered as the keyframes is different from an image capturing direction sub1 in accordance with an actual attitude of the mobile object 300. Therefore, in the example illustrated in FIG. 19, concerning the sub-image capturing unit 305a, a scene different from the scene captured as the keyframe image is captured as the query image. Therefore, concerning the sub-image capturing unit 305a, a common field of view between the keyframe image and the query image tends to be narrow, and eventually, there is a possibility that there is no common field of view.

In contrast, concerning the sub-image capturing unit 305b, an image capturing direction sub2 indicated by the information registered as the keyframes is substantially equal to an image capturing direction sub2 in accordance with an actual attitude of the mobile object 300. Therefore, in the example illustrated in FIG. 19, concerning the sub-image capturing unit 305b, a scene which is similar to the scene captured as the keyframe image except a difference in a rotation direction around the optical axis of the sub-image capturing unit 305b is captured as the query image. Therefore, concerning the sub-image capturing unit 305b, a common field of view between the keyframe image and the query image is wider than that in a case of the sub-image capturing unit 305a.

That is, in the example illustrated in FIG. 19, the information processing apparatus 100 selects the sub-image capturing unit 305b with a wider common field of view between the keyframe image and the query image among the sub-image capturing units 305a and 305b.

Particularly, change of a field of view of each image capturing unit in association with rotation of the mobile object 300 tends to be larger than change of a field of view of each image capturing unit in association with translation of the mobile object 300. Therefore, in the information processing system according to modified example 7, the sub-image capturing unit 305 with a wider common field of view between the keyframe image and the query image is selected by the image capturing directions (that is, vectors in the optical axis directions of the image capturing units) being compared as described above by utilizing such characteristics.

By the control as described above, according to the information processing system 1 according to modified example 7, the information processing apparatus 100 can select the sub-image capturing unit 305 with a wider common field of view (that is, less change in a field of view) between the keyframe image and the query image among the plurality of sub-image capturing units 305. Therefore, according to the information processing system 1 according to modified example 7, it becomes possible to further improve accuracy relating to verification of the estimation results of the attitude parameters of the mobile object 300.

An example of control relating to selection of the sub-image capturing unit 305 to be utilized for verification of the estimation results of the attitude parameters in a case where a plurality of sub-image capturing units 305 is set has been described above with reference to FIG. 19 as modified example 7.

4. HARDWARE CONFIGURATION

Figure 20:
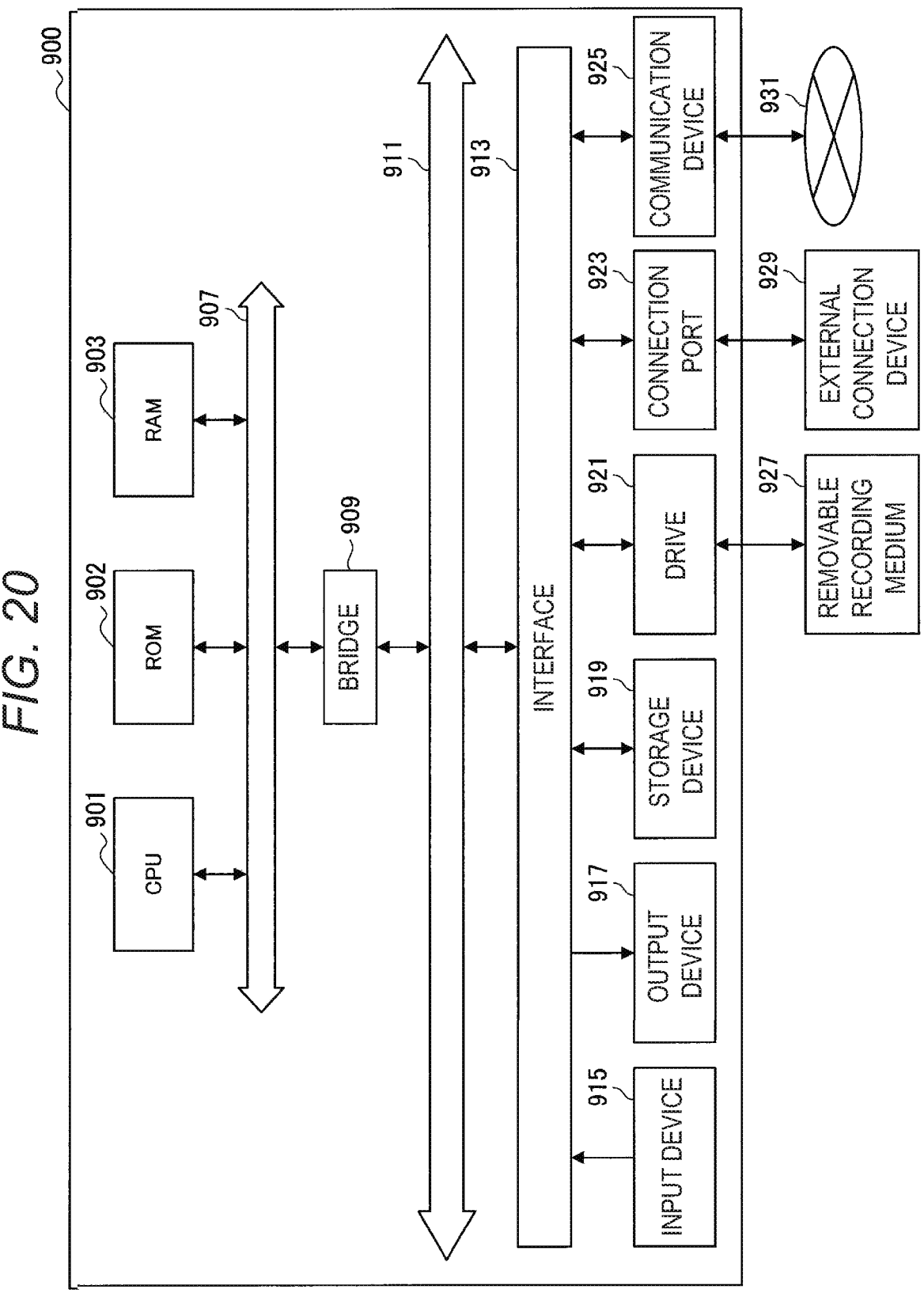
FIG. 20 is a function block diagram illustrating a configuration example of a hardware configuration of an information processing apparatus included in the information processing system according to the embodiment.

Next, a hardware configuration of the information processing apparatus constituting the information processing system according to an embodiment of the present disclosure such as the information processing apparatus 100 described above will be described with reference to FIG. 20. FIG. 20 is a functional block diagram illustrating an example of the hardware configuration of the information processing apparatus constituting the information processing system according to an embodiment of the present disclosure.

The information processing apparatus 900 included in the information processing system according to the present embodiment mainly includes a CPU 901, a ROM 902, and a RAM 903. Furthermore, the information processing apparatus 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing apparatus 900 according to various programs recorded in the ROM 902, the RAM 903, the storage device 919, or a removable recording medium 927. The ROM 902 stores programs, operation parameters, and the like used by the CPU 901. The RAM 903 primarily stores programs that the CPU 901 uses and parameters and the like varying as appropriate during the execution of the programs. These are connected with each other via the host bus 907 including an internal bus such as a CPU bus. For example, the estimating unit 101 and the verifying unit 103 illustrated in FIG. 13 can include the CPU 901.

The host bus 907 is connected to the external bus 911 such as a Peripheral Component Interconnect/Interface (PCI) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal, for example. Also, the input device 915 may be a remote control mechanism (a so-called remote control) using, for example, infrared light or other radio waves, or may be an external connection device 929 such as a mobile phone or a PDA conforming to the operation of the information processing apparatus 900. Furthermore, the input device 915 generates an input signal on the basis of, for example, information which is input by a user with the above operation mechanism, and includes an input control circuit for outputting the input signal to the CPU 901. The user of the information processing apparatus 900 can input various data to the information processing apparatus 900 and can instruct the information processing apparatus 900 to perform processing by operating the input device 915.

The output device 917 includes a device capable of visually or audibly notifying a user of acquired information. Examples of such a device include display devices such as a CRT display device, a liquid crystal display device, a plasma display device, an EL display device, and lamps, audio output devices such as a speaker and a headphone, a printer, and the like. For example, the output device 917 outputs a result obtained by various processes performed by the information processing apparatus 900. More specifically, the display device displays, in the form of texts or images, a result obtained by various processes performed by the information processing apparatus 900. On the other hand, the audio output device converts an audio signal including reproduced audio data, sound data, and the like into an analog signal, and outputs the analog signal.

The storage device 919 is a device for storing data configured as an example of a storage unit of the information processing apparatus 900. The storage device 919 is configured from, for example, a magnetic storage device such as a Hard Disk Drive (HDD), a semiconductor storage device, an optical storage device, or a magneto-optical storage device. This storage device 919 stores programs to be executed by the CPU 901, various data, and the like. For example, the storage unit 150 illustrated in FIG. 13 can include the storage device 919.

The drive 921 is a reader/writer for recording medium, and is embedded in the information processing apparatus 900 or attached externally thereto. The drive 921 reads information recorded in the attached removable recording medium 927 such as a magnetic disk, an optical disc, a magneto-optical disk, or a semiconductor memory, and outputs the read information to the RAM 903. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, a Blu-ray (registered trademark) medium, or the like. In addition, the removable recording medium 927 may be a CompactFlash (CF; registered trademark), a flash memory, a Secure Digital Memory Card (SD memory card), or the like. Alternatively, the removable recording medium 927 may be, for example, an Integrated Circuit Card (IC card) equipped with a non-contact IC chip, an electronic appliance, or the like.

The connection port 923 is a port for allowing devices to directly connect to the information processing apparatus 900. Examples of the connection port 923 include a Universal Serial Bus (USB) port, an IEEE1394 port, a Small Computer System Interface (SCSI) port, and the like. Other examples of the connection port 923 include an RS-232C port, an optical audio terminal, a High-Definition Multimedia Interface (HDMI) (registered trademark) port, and the like. By the external connection device 929 connecting to this connection port 923, the information processing apparatus 900 directly obtains various types of data from the external connection device 929 and provides various types of data to the external connection device 929.

The communication device 925 is a communication interface including, for example, a communication device for connecting to a communication network 931 or the like. The communication device 925 is, for example, a wired or wireless Local Area Network (LAN), Bluetooth (registered trademark), a communication card for Wireless USB (WUSB), or the like. Alternatively, the communication device 925 may be a router for optical communication, a router for Asymmetric Digital Subscriber Line (ADSL), a modem for various communications, or the like. This communication device 925 can transmit and receive signals and the like in accordance with a predetermined protocol such as TCP/IP on the Internet and with other communication devices, for example. In addition, the communication network 931 connected to the communication device 925 includes a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 900 included in the information processing system according to the embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 20, for example, it naturally includes various configurations corresponding to the information processing apparatus 900 included in the information processing system.

Note that it is also possible to develop a computer program for realizing the respective functions of the information processing apparatus 900 included in the information processing system according to the present embodiment as described above, and implement the computer program in a personal computer or the like. In addition, a computer-readable recording medium storing such a computer program may also be provided. The recording medium may be a magnetic disk, an optical disc, a magneto-optical disk, flash memory, or the like, for example. Furthermore, the above computer program may also be delivered via a network, for example, without using a recording medium. In addition, the number of computers causing the computer program to be executed is not particularly limited. For example, the computer program may be executed in cooperation of a plurality of computers (e.g., a plurality of servers or the like).

5. CONCLUSION

As described above, in the information processing system 1 according to the present embodiment, the main image capturing unit 303 and the sub-image capturing unit 305 are held in the chassis 301 of the mobile object 300 which becomes a target for estimation of attitude parameters so as to have optical axes different from each other. On the basis of such a configuration, the information processing apparatus 100 estimates the location and the attitude (that is, attitude parameters) of the mobile object 300 in real space on the basis of the main image captured by the main image capturing unit 303. Further, the information processing apparatus 100 verifies a likelihood of the above-described estimation results of the location and the attitude of the mobile object 300 on the basis of the sub-image captured by the sub-image capturing unit 305.

By the configuration as described above, according to the information processing system 1 according to the present embodiment, it becomes possible to further improve accuracy relating to estimation of the location and the attitude of the mobile object 300 in real space, and eventually, it becomes possible to prevent erroneous estimation of the location and the attitude.

Note that the main image capturing unit 303 corresponds to an example of a "first image capturing unit", and the main image captured by the main image capturing unit 303 corresponds to an example of a "first image". Further, the sub-image capturing unit 305 corresponds to an example of a "second image capturing unit", and the sub-image captured by the sub-image capturing unit 305 corresponds to an example of a "second image".

Further, it is also possible to utilize the above-described embodiment and respective modified examples in combination as appropriate. As a specific example, in a case where a plurality of main image capturing units 303 and a plurality of sub-image capturing units 305 are each set, it is also possible to utilize technologies respectively described in modified example 2 and modified example 3 in combination.

The preferred embodiment of the present disclosure has been described above with reference to the accompanying drawings, whilst the technical scope of the present disclosure is not limited to the above examples. A person skilled in the art may find various alterations and modifications within the scope of the technical idea described in the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the technical scope of the present disclosure may also be configured as below.

(1)

An information processing apparatus including:

an estimating unit configured to estimate at least one of a location or an attitude of a predetermined chassis in real space on the basis of a first image captured by a first image capturing unit among a plurality of image capturing units held in the chassis; and a verifying unit configured to verify a likelihood of the estimation result on the basis of a second image captured by a second image capturing unit having an optical axis different from an optical axis of the first image capturing unit among the plurality of image capturing units.

(2)

The information processing apparatus according to (1), in which the verifying unit verifies the likelihood of the estimation result by comparing a first feature amount extracted from the second image with a second feature amount recorded in advance in association with at least one of the location or the attitude of the chassis in real space.

(3)

The information processing apparatus according to (2), in which the second feature amount is acquired on the basis of the second image captured by the second image capturing unit in accordance with at least one of the location or the attitude of the chassis in real space.

(4)

The information processing apparatus according to (3), in which the verifying unit verifies the likelihood of the estimation result by comparing feature amounts respectively corresponding to one or more feature points extracted as the first feature amount from the second image to be utilized for verification of the estimation result with feature amounts respectively corresponding to one or more feature points recorded as the second feature amount.

(5)

The information processing apparatus according to (4), in which the verifying unit verifies the likelihood of the estimation result by comparing feature amounts of partial areas including the feature points extracted as the first feature amount from the second image to be utilized for verification of the estimation result with feature amounts of partial areas including the feature points recorded as the second feature amount.

(6)

The information processing apparatus according to (5), in which the verifying unit calculates similarity between the partial area including the feature point and the partial area including the corresponding feature point among the one or more feature points recorded as the second feature amount for each of the one or more feature points extracted as the first feature amount from the second image to be utilized for verification of the estimation result and verifies the likelihood of the estimation result in accordance with a number of the feature points for which a calculation result of the similarity becomes equal to or greater than a threshold.

(7)

The information processing apparatus according to any one of (3) to (6), in which two or more image capturing units are set as candidates for the second image capturing unit among the plurality of image capturing units, the second feature amount is associated with a parameter in accordance with an attitude of the second image capturing unit in real space when the second image which is an extraction source is captured, the estimating unit acquires the parameter for each of a plurality of candidates for the second image capturing unit on the basis of the first image, and the verifying unit selects at least part of the candidates on the basis of the parameter acquired for each of the plurality of candidates for the second image capturing unit and the parameter in association with the second feature amount and verifies the likelihood of the estimation result on the basis of the second image captured by the selected candidate.

(8)

The information processing apparatus according to (1), in which the verifying unit verifies the likelihood of the estimation result using a discriminator generated in accordance with machine learning based on the second image captured by the second image capturing unit for each of at least one of the location or the attitude of the chassis in real space.

(9)

The information processing apparatus according to (1), in which the verifying unit verifies the likelihood of the estimation result in accordance with similarity between the second image to be utilized for verification of the estimation result and the second image captured in past.

(10)

The information processing apparatus according to any one of (1) to (9), in which two or more image capturing units are set as the second image capturing units among the plurality of image capturing units, and the verifying unit verifies the likelihood of the estimation result on the basis of the second image captured by each of the two or more second image capturing units.

(11)

The information processing apparatus according to any one of (1) to (10), in which the estimating unit selects a new first image capturing unit from the plurality of image capturing units in accordance with the verification result, and estimates at least one of the location or the attitude of the chassis in real space again on the basis of a new first image captured by the new first image capturing unit.

(12)

The information processing apparatus according to (11), in which the estimating unit selects the new first image capturing unit among two or more image capturing units set as candidates for the first image capturing unit among the plurality of image capturing units in accordance with the verification result.

(13)

The information processing apparatus according to (11), in which the estimating unit selects the second image capturing unit as the new first image capturing unit in accordance with the verification result, and the verifying unit selects the first image capturing unit before the selection as a new second image capturing unit and verifies the estimation result based on the new first image on the basis of a new second image captured by the new second image capturing unit.

(14)

The information processing apparatus according to any one of (1) to (13), in which the chassis is a chassis of a mobile object, and the estimating unit estimates at least one of the location or the attitude of the chassis in real space on the basis of the first image captured by the first image capturing unit which captures an image in a direction different from a traveling direction of the mobile object.

(15)

The information processing apparatus according to any one of (1) to (14), in which the verifying unit verifies the likelihood of the estimation result on the basis of the second image captured by the second image capturing unit which captures an image in a direction opposite to a direction of the first image capturing unit.

(16)

An information processing method including:

by a computer, estimating at least one of a location or an attitude of a predetermined chassis in real space on the basis of a first image captured by a first image capturing unit among a plurality of image capturing units held in the chassis; and verifying a likelihood of the estimation result on the basis of a second image captured by a second image capturing unit having an optical axis different from an optical axis of the first image capturing unit among the plurality of image capturing units.

(17)

A program causing a computer to execute:

estimating at least one of a location or an attitude of a predetermined chassis in real space on the basis of a first image captured by a first image capturing unit among a plurality of image capturing units held in the chassis; and verifying a likelihood of the estimation result on the basis of a second image captured by a second image capturing unit having an optical axis different from an optical axis of the first image capturing unit among the plurality of image capturing units.

REFERENCE SIGNS LIST

1 Information processing system
100 Information processing apparatus
101 Estimating unit
103 Verifying unit
150 Storage unit
300 Mobile object
301 Chassis
303 Main image capturing unit
305 Sub-image capturing unit

The invention claimed is:

1. An information processing apparatus, comprising:
a central processing unit (CPU) configured to:
acquire a first image from a first image capturing unit of a plurality of image capturing units, wherein the plurality of image capturing units is in a chassis in real space;
estimate at least one of a location or an attitude of the chassis in the real space based on the first image;
acquire a second image from a second image capturing unit of the plurality of image capturing units;
verify a result of the estimation based on a comparison of a first feature amount with a second feature amount,
wherein
the first feature amount is extracted from the second image,
the second feature amount is acquired from a database, the database stores the second feature amount in association with at least one of the location or the attitude of the chassis in the real space, and an optical axis of the second image capturing unit is different from an optical axis of the first image capturing unit;

output the result of the estimation based on a first result of the verification;

select a third image capturing unit from the plurality of image capturing units based on a second result of the verification different from the first result of the verification, wherein the third image capturing unit captures a third image; and re-estimate the at least one of the location or the attitude of the chassis in the real space based on the third image captured by the selected third image capturing unit.

2. The information processing apparatus according to claim 1, wherein the CPU is further configured to acquire the second feature amount from the database based on the second image.

3. The information processing apparatus according to claim 2, wherein the CPU is further configured to:
extract, from the second image, a first plurality of feature amounts as the first feature amount, wherein each feature amount of the first plurality of feature amounts corresponds to a respective feature point of a first plurality of feature points; and verify the result of the estimation by comparison of the extracted first plurality of feature amounts with a second plurality of feature amounts, each feature amount of the second plurality of feature amounts corresponds to a respective feature point of a second plurality of feature points, and the second plurality of feature amounts is stored in the database as the second feature amount.

4. The information processing apparatus according to claim 3, wherein the CPU is further configured to:
extract, from the second image, a third plurality of feature amounts of first partial areas as the first feature amount, wherein the first partial areas include the first plurality of feature points; and verify the result of the estimation by comparison of the extracted third plurality of feature amounts of the first partial areas with a fourth plurality of feature amounts of second partial areas, the second partial areas include the second plurality of feature points, and the fourth plurality of feature amounts is stored in the database as the second feature amount.

5. The information processing apparatus according to claim 4, wherein the CPU is further configured to:

calculate a similarity between each feature amount of the third plurality of feature amounts of the first partial areas and a corresponding feature amount of the fourth plurality of feature amounts of the second partial areas; and verify the result of the estimation based on a number of feature points for which a result of the calculation of the similarity is equal to or greater than a threshold.

6. The information processing apparatus according to claim 2, wherein at least two image capturing units of the plurality of image capturing units are set as a plurality of candidates for the second image capturing unit, the second image capturing unit captures the second image as an extraction source, the second feature amount is associated with a parameter based on the capture of the second image as the extraction source, the parameter associated with the second feature amount is based on an attitude of the second image capturing unit in the real space, and the CPU is further configured to:
acquire the parameter for each candidate of the plurality of candidates based on the first image;

select at least one candidate of the plurality of candidates based on the parameter acquired for each candidate of the plurality of candidates and the parameter associated with the second feature amount, wherein the selected at least one candidate captures the second image; and verify the result of the estimation based on the second image captured by the selected at least one candidate.

7. The information processing apparatus according to claim 1, wherein the CPU is further configured to verify the result of the estimation based on a discriminator generated by a machine learning process, the machine learning process is based on the second image captured by the second image capturing unit, and the discriminator is associated with the at least one of the location or the attitude of the chassis in the real space.

8. The information processing apparatus according to claim 1, wherein the CPU is further configured to:

acquire a fourth image captured by the second image capturing unit, wherein the capture of the fourth image is prior to capture of the second image by the second image capturing unit; and verify the result of the estimation based on a similarity between the second image and the acquired fourth image.

9. The information processing apparatus according to claim 1, wherein at least two image capturing units of the plurality of image capturing units correspond to the second image capturing unit, each image capturing unit of the at least two image capturing units captures the second image, and the CPU is further configured to verify the result of the estimation based on the second image captured by each image capturing unit of the at least two image capturing units.

10. The information processing apparatus according to claim 1, wherein at least two image capturing units of the plurality of image capturing units are set as a plurality of candidates for the first image capturing unit, and the CPU is further configured to select, based on the second result of the verification, the third image capturing unit from the at least two image capturing units that are set as the plurality of candidates for the first image capturing unit.

11. The information processing apparatus according to claim 1, wherein the CPU is further configured to:

select the first image capturing unit as a new second image capturing unit based on the second result of the verification;

select the second image capturing unit as a new first image capturing unit based on the second result of the verification, wherein the selection of the first image capturing unit is before the selection of the second image capturing unit; and verify the result of the estimation based on a fourth image captured by the new second image capturing unit.

12. The information processing apparatus according to claim 1, wherein
the chassis is a chassis of a mobile object,
the first image capturing unit captures the first image in a direction different from a traveling direction of the mobile object, and
the CPU is further configured to estimate the at least one of the location or the attitude of the chassis in the real space based on the first image captured by the first image capturing unit.

13. The information processing apparatus according to claim 1, wherein
the second image capturing unit captures the second image in a direction opposite to an image capturing direction of the first image capturing unit, and
the CPU is further configured to verify the result of the estimation based on the second image captured by the second image capturing unit.

14. An information processing method, comprising:
in an information processing apparatus that includes a central processing unit (CPU):
acquiring, by the CPU, a first image from a first image capturing unit of a plurality of image capturing units, wherein the plurality of image capturing units is in a chassis in real space;
estimating, by the CPU, at least one of a location or an attitude of the chassis in the real space based on the first image;
acquiring, by the CPU, a second image from a second image capturing unit of the plurality of image capturing units;
verifying, by the CPU, a result of the estimation based on a comparison of a first feature amount with a second feature amount, wherein
the first feature amount is extracted from the second image,
the second feature amount is acquired from a database,
the database stores the second feature amount in association with at least one of the location or the attitude of the chassis in the real space, and
an optical axis of the second image capturing unit is different from an optical axis of the first image capturing unit;
outputting, by the CPU, the result of the estimation based on a first result of the verification;
selecting, by the CPU, a third image capturing unit from the plurality of image capturing units based on a second result of the verification different from the first result of the verification, wherein the third image capturing unit captures a third image; and
re-estimating, by the CPU, the at least one of the location or the attitude of the chassis in the real space based on the third image captured by the selected third image capturing unit.

15. A non-transitory computer-readable medium having stored thereon computer-executable instructions which, when executed by a processor, cause the processor to execute operations, the operations comprising:
acquiring a first image from a first image capturing unit of a plurality of image capturing units, wherein the plurality of image capturing units is in a chassis in real space;
estimating at least one of a location or an attitude of the chassis in the real space based on the first image;
acquiring a second image from a second image capturing unit of the plurality of image capturing units;
verifying a result of the estimation based on a comparison of a first feature amount with a second feature amount, wherein
the first feature amount is extracted from the second image,
the second feature amount is acquired from a database,
the database stores the second feature amount in association with the at least one of the location or the attitude of the chassis in the real space, and
an optical axis of the second image capturing unit is different from an optical axis of the first image capturing unit;
outputting the result of the estimation based on a first result of the verification;
selecting a third image capturing unit from the plurality of image capturing units based on a second result of the verification different from the first result of the verification, wherein the third image capturing unit captures a third image; and
re-estimating the at least one of the location or the attitude of the chassis in the real space based on the third image captured by the selected third image capturing unit.

* * * * *